United States Patent
Park et al.

(10) Patent No.: US 11,284,381 B2
(45) Date of Patent: Mar. 22, 2022

(54) METHOD AND APPARATUS FOR DATA TRANSMISSION AND RECEPTION FOR NETWORK COORDINATED COMMUNICATION

(71) Applicant: Samsung Electronics Co., Ltd., Suwon-si (KR)

(72) Inventors: Jinhyun Park, Suwon-si (KR); Hoondong Noh, Suwon-si (KR); Heecheol Yang, Suwon-si (KR); Younsun Kim, Suwon-si (KR); Hyoungju Ji, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 142 days.

(21) Appl. No.: 16/736,220

(22) Filed: Jan. 7, 2020

(65) Prior Publication Data
US 2020/0229156 A1     Jul. 16, 2020

(30) Foreign Application Priority Data

Jan. 10, 2019   (KR) .................. 10-2019-0003521

(51) Int. Cl.
| | | |
|---|---|---|
| *H04W 72/04* | (2009.01) | |
| *H04L 5/00* | (2006.01) | |
| *H04B 7/0452* | (2017.01) | |
| *H04W 72/12* | (2009.01) | |

(52) U.S. Cl.
CPC ........ *H04W 72/042* (2013.01); *H04B 7/0452* (2013.01); *H04L 5/0058* (2013.01); *H04W 72/1289* (2013.01)

(58) Field of Classification Search
CPC ............ H04W 72/042; H04W 72/1289; H04B 7/0452; H04L 5/0058
USPC ....................................................... 370/329
See application file for complete search history.

(56) References Cited

U.S. PATENT DOCUMENTS

| | | |
|---|---|---|
| 2018/0049236 A1 | 2/2018 | Sun et al. |
| 2018/0219656 A1 | 8/2018 | Lee et al. |
| 2018/0270799 A1 | 9/2018 | Noh et al. |
| 2019/0379431 A1* | 12/2019 | Park .................. H04L 27/2613 |
| 2020/0083966 A1* | 3/2020 | Dou ..................... H04L 5/0048 |

(Continued)

FOREIGN PATENT DOCUMENTS

KR    10-2018-0089865 A     8/2018

OTHER PUBLICATIONS

ZTE, 'Enhancements on multi-TRP/Panel transmission', R1-1812256, 3GPP TSG RAN WG1 Meeting #95, Nov. 3, 2018.

(Continued)

*Primary Examiner* — Peter G Solinsky
(74) *Attorney, Agent, or Firm* — Jefferson IP Law, LLP

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. A method and an apparatus for transmitting and receiving data for coordination communication is provided.

16 Claims, 16 Drawing Sheets

(56) References Cited

U.S. PATENT DOCUMENTS

| 2020/0153543 | A1* | 5/2020 | Khoshnevisan | H04L 27/2649 |
| 2020/0196383 | A1* | 6/2020 | Tsai | H04L 5/0092 |
| 2020/0204306 | A1* | 6/2020 | Wang | H04L 1/1819 |
| 2020/0221487 | A1* | 7/2020 | Lee | H04L 5/0053 |
| 2020/0235901 | A1* | 7/2020 | Dou | H04B 7/024 |
| 2021/0119836 | A1* | 4/2021 | Ge | H04L 5/0094 |
| 2021/0127374 | A1* | 4/2021 | Matsumura | H04L 5/0094 |
| 2021/0212040 | A1* | 7/2021 | Ge | H04W 72/04 |
| 2021/0219313 | A1* | 7/2021 | Matsumura | H04W 72/1289 |

OTHER PUBLICATIONS

Qualcomm Incorporated, 'Multi-TRP Enhancements', R1-1813442, 3GPP TSG-RAN WG1 Meeting #95, Nov. 3, 2018.
LG Electronics, 'Enhancements on multi-TRP/panel transmission', R1-1812581, 3GPP TSG RAN WG1 Meeting #95, Nov. 3, 2018.
International Search Report dated Apr. 10, 2020, issued in International Application No. PCT/KR2020/000278.
Written Opinion dated Apr. 10, 2020, issued in International Application No. PCT/KR2020/000278.

* cited by examiner

METHOD AND APPARATUS FOR DATA TRANSMISSION AND RECEPTION FOR NETWORK COORDINATED COMMUNICATION

CROSS-REFERENCE TO RELATED APPLICATION(S)

This application is based on and claims priority under 35 U.S.C. § 119(a) of a Korean patent application number 10-2019-0003521, filed on Jan. 10, 2019, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for transmitting and receiving data between a terminal and a plurality of transmission nodes performing coordinated communication in order to smoothly provide a service.

2. Description of Related Art

To meet the demand for wireless data traffic having increased since deployment of 4th-Generation (4G) communication systems, efforts have been made to develop an improved 5th-Generation (5G) or pre-5G communication system. Therefore, the 5G or pre-5G communication system is also called a 'Beyond 4G Network' or a 'Post long-term evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid Frequency-Shift Keying (FSK) and Quadrature Amplitude Modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

With the development of communication systems, studies are actively being conducted on processes of exchanging data between a plurality of nodes performing network coordinated communication and a terminal.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a wireless communication system and, more particularly, to a method and an apparatus for efficiently transmitting data between a terminal and a plurality of transmission nodes performing coordinated communication.

Additional aspects will be set forth in part in the description which follows and, in part, will be apparent from the description, or may be learned by practice of the presented embodiments.

In accordance with an aspect of the disclosure, when network coordinated communication is used in a wireless communication system, it is possible to reduce reception hardware complexity and computational complexity of a terminal. In addition, when network coordinated communication is used, it is possible to reduce interference in a terminal by different transmission and reception nodes, thus efficiently performing network coordinated communication.

In accordance with an embodiment of the disclosure, a method performed by a terminal comprises: receiving, from a first transmission and reception point (TRP), first downlink control information (DCI) scheduling a first physical downlink shared channel (PDSCH) transmission; receiving, from a second TRP, second DCI scheduling a second PDSCH transmission, wherein the second PDSCH transmission overlaps with the first PDSCH on a time-frequency resource; and receiving the first PDSCH transmission and the second PDSCH transmission based on a first demodulation reference signal (DMRS) associated with the first PDSCH transmission and a second DMRS associated with the second PDSCH transmission, wherein the first DMRS and the second DMRS are received on a same location within the time-frequency resource.

In accordance with an embodiment of the disclosure, a method performed by a first transmission and reception point (TRP) comprises: transmitting, to a terminal, first downlink control information (DCI) scheduling a first physical downlink shared channel (PDSCH) transmission; and transmitting, to the terminal, the first PDSCH transmission based on a demodulation reference signal (DMRS) associated with the first PDSCH transmission, wherein second DCI scheduling a second PDSCH transmission is transmitted to the terminal from a second TRP, wherein the second PDSCH transmission is transmitted to the terminal based on a second DMRS associated with the second PDSCH transmission, wherein the second PDSCH transmission overlaps with the first PDSCH transmission on a time-frequency resource, and wherein the first DMRS and the second DMRS are transmitted on a same location within the time-frequency resource.

In accordance with an embodiment of the disclosure, a terminal comprises: a transceiver configured to transmit and receive a signal; and a controller configured to: receive, from a first transmission and reception point (TRP), first downlink control information (DCI) scheduling a first physical downlink shared channel (PDSCH) transmission, receive, from a second TRP, second DCI scheduling a second PDSCH transmission, wherein the second PDSCH transmission overlaps with the first PDSCH on a time-frequency resource, and receive the first PDSCH transmission and the second PDSCH transmission based on a first demodulation reference signal (DMRS) associated with the first PDSCH transmission and a second DMRS associated with the second PDSCH transmission, wherein the first DMRS and the second DMRS are received on a same location within the time-frequency resource.

In accordance with an embodiment of the disclosure, a first TRP comprises: a transceiver configured to transmit and receive a signal; and a controller configured to: transmit, to a terminal, first downlink control information (DCI) scheduling a first physical downlink shared channel (PDSCH) transmission, and transmit, to the terminal, the first PDSCH transmission based on a demodulation reference signal (DMRS) associated with the first PDSCH transmission, wherein second DCI scheduling a second PDSCH transmission is transmitted to the terminal from a second TRP, wherein the second PDSCH transmission is transmitted to the terminal based on a second DMRS associated with the second PDSCH transmission, wherein the second PDSCH transmission overlaps with the first PDSCH transmission on a time-frequency resource, and wherein the first DMRS and the second DMRS are transmitted on a same location within the time-frequency resource.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and its advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
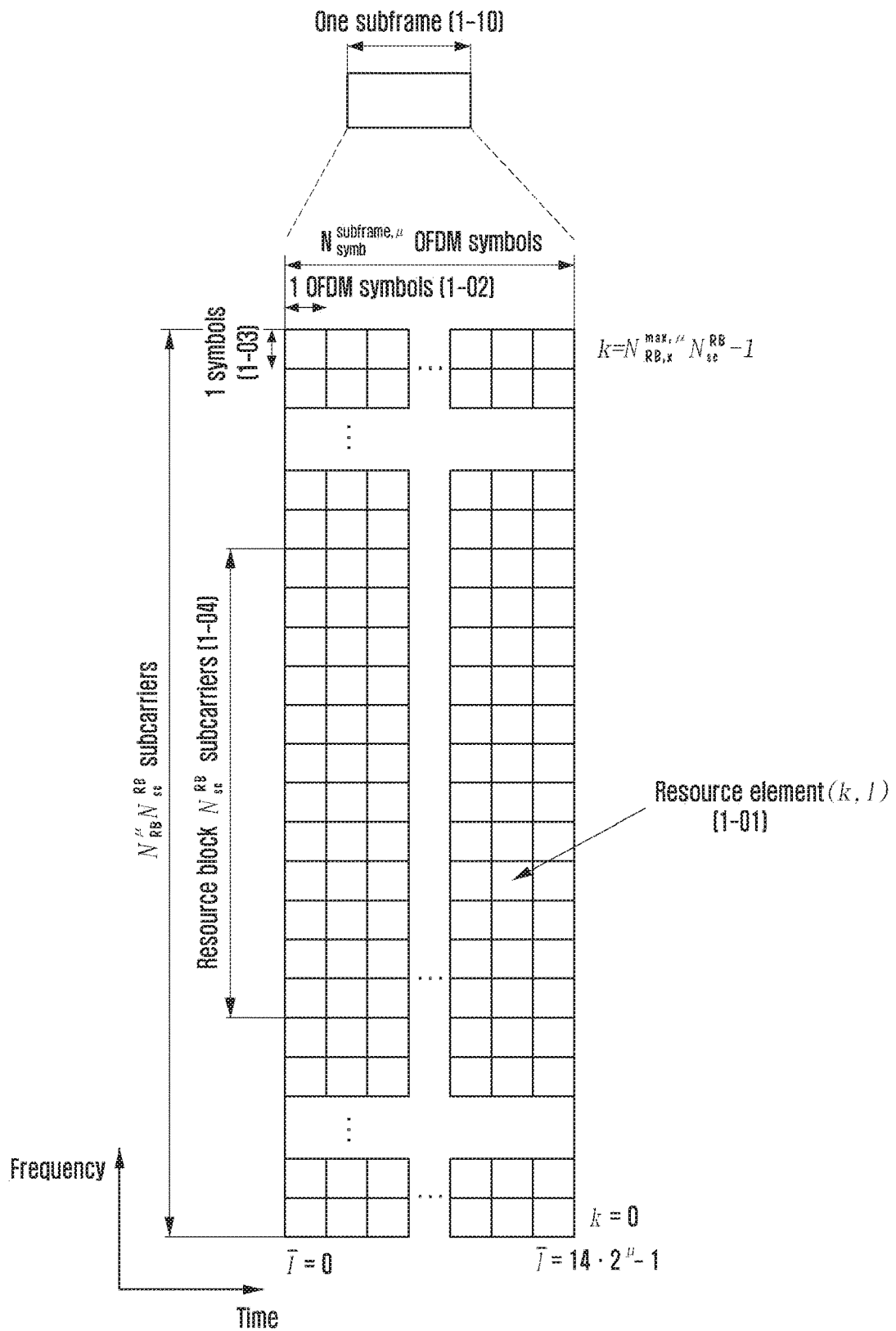
FIG. 1 illustrates a transmission structure in a time-frequency domain of an LTE, LTE-A, or NR system or a similar wireless commutation system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments, descriptions of technologies which are already known to those skilled in the art and are not directly related to the disclosure may be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and methods of achieving the same will be apparent by referring to embodiments of the disclosure as described below in detail in conjunction with the accompanying drawings. The disclosure is not limited to embodiments disclosed below but may be embodied in various forms. Rather, these embodiments are provided so that this disclosure will be thorough and complete, and will fully convey the scope of the disclosure to those skilled in the art to which the disclosure pertains. The disclosure is defined only by the scope of claims. Like reference numerals refer to like elements throughout.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a non-transitory computer usable or computer-readable memory that can direct a computer or other programmable data processing apparatus to function in a particular manner, such that the instructions stored in the non-transitory computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. Further, according to some embodiments, the "unit" may include one or more processors.

Hereinafter, the operating principle of the disclosure will be described in detail with reference to the accompanying drawings. In the following description of the disclosure, a detailed description of known configurations or functions incorporated herein will be omitted when it is determined that the detailed description may make the subject matter of the disclosure unclear. The terms as described below are defined in consideration of the functions in the embodiments, and the meaning of the terms may vary according to the intention of a user or operator, convention, or the like. Therefore, the definitions of the terms should be made based on the contents throughout the specification. Hereinafter, a base station is an entity that performs resource allocation for a terminal and may be at least one of a gNode B, an eNode B, a Node B, a base station (BS), a radio access unit, a base station controller, a transmission and reception point (TRP), or a node in a network. A terminal may include a user equipment (UE), a mobile station, a cellular phone, a smartphone, a computer, or a multimedia system capable of performing a communication function but is not limited thereto.

Hereinafter, embodiments illustrate a technology for a terminal to receive broadcast information from a base station in a wireless communication system. As used in the following description, a term referring to broadcast information, a term referring to control information, a term related to communication coverage, a term referring to a state change (e.g., an event), terms referring to network entities, terms referring to messages, a term referring to a component of an apparatus, and the like are illustrated for convenience of description. Therefore, the disclosure is not limited by the following terms, and other terms having equivalent technical meanings may be used.

For convenience of explanation, some terms and words defined in the third generation partnership project long term evolution (3GPP LTE) standard may be used. However, the disclosure is not limited by these terms and words and may be equally applied to systems in accordance with other standards.

A wireless communication system is evolving from initially providing voice-oriented services into a broadband wireless communication system for providing high-speed and high-quality packet data services according to a communication standard, for example, high speed packet access (HSPA), long-term evolution (LTE or evolved universal terrestrial radio access (E-UTRA)), LTE-advanced (LTE-A), or LTE-Pro of the 3GPP, high rate packet data (HRPD) or ultra mobile broadband (UMB) of the 3GPP2, and IEEE 802.16e.

As a representative example of a broadband wireless communication system, an LTE system employs an orthogonal frequency division multiplexing (OFDM) scheme for a downlink (DL) and employs a single-carrier frequency division multiple access (SC-FDMA) scheme for an uplink (UL). The uplink refers to a radio link for a user equipment (UE) or a mobile station (MS) to transmit data or a control signal to an eNode B or a base station (BS), and the downlink refers to a radio link for the eNode B to transmit data or a control signal to the UE. These multiple access schemes allocate and manage time-frequency resources for carrying data or control information per user not to overlap with each other, that is, to be orthogonal to each other, thereby dividing data or control information for each user.

A post-LTE communication system, that is, a 5G communication system needs to be able to freely reflect various demands from users and service providers and is thus required to support services satisfying various requirements. Services considered for a 5G communication system include enhanced mobile broadband (eMBB), massive machine-type communication (mMTC), ultra reliability and low latency communications (URLLC), and the like.

According to some embodiments, eMBB is intended to provide a further enhanced data rate than that supported by existing LTE, LTE-A, or LTE-Pro. For example, in a 5G communication system, for one base station, eMBB needs to be able to provide a peak data rate of 20 Gbps in a downlink and a peak data rate of 10 Gbps in an uplink. Further, eMBB needs to provide an increased user-perceived data rate. In order to meet these requirements, improved transmission and reception technologies including an enhanced multiple-input and multiple-output (MIMO) transmission technology are required. In addition, it is possible to satisfy a data rate required for a 5G communication system by employing a frequency bandwidth wider than 20 MHz in a frequency band ranging from 3 to 6 GHz or a 6-GHz frequency band or higher instead of a 2-GHz band currently used for LTE.

In a 5G communication system, mMTC is taken into consideration to support application services, such as the Internet of Things (IoT). To efficiently provide the IoT, mMTC may require support for access of a great number of UEs in a cell, enhanced UE coverage, increased battery time, reduced UE cost, and the like. The IoT is attached to various sensors and various devices to provide a communication function and thus needs to be able to support a large number of UEs (e.g., 1,000,000 UEs/km$^2$) in a cell. A UE supporting mMTC is highly likely to be located in a shadow area not covered by a cell, such as the basement of a building, due to the nature of services and may thus require wider coverage than for other services provided by the 5G communication system. A UE supporting mMTC needs to be configured as a low-cost UE, and may require a very long battery life time because it is difficult to frequently change the battery of the UE.

Finally, URLLC is a mission-critical cellular-based wireless communication service, which is used for remote control of robots or machinery, industrial automation, unmanned aerial vehicles, remote health care, emergency alerts, and the like and needs to provide ultralow-latency and ultra-reliability communication. For example, a URLLC-supporting service is required not only to satisfy an air interface latency of less than 0.5 milliseconds but also to have a packet error rate of 10$^{-5}$ or less. Therefore, for the URLLC-supporting service, a 5G system needs to provide a shorter transmission time interval (TTI) than that of other services and also requires a design for allocating a wide resource in a frequency band. The foregoing mMTC, URLLC, and eMBB are merely examples of different service types, and service types to which the disclosure is applied are not limited to the foregoing examples.

The foregoing services considered in a 5G communication system need to be provided in a fusion with each other based on one framework. That is, for efficient resource management and control, it is preferable that the services are controlled and transmitted as one integrated system rather than being operated independently.

Hereinafter, although embodiments will be described with reference to an LTE, LTE-A, LTE Pro, or NR system as an example, these embodiments may also be applied to other communication systems having a similar technical background or channel form. Further, the embodiments may also be applied to other communication systems through some modifications without departing from the scope of the disclosure as determined by those skilled in the art.

Hereinafter, a frame structure of a 5G system will be described in detail with reference to accompanying drawings.

FIG. 1 illustrates the basic structure of a time-frequency domain, which is a radio resource region in which a data or control channel is transmitted in a 5G system according to an embodiment of the disclosure.

Referring to FIG. 1, the horizontal axis represents a time domain, and the vertical axis represents a frequency domain. The basic unit of a resource in the time-frequency domain is a resource element (RE) 1-01, which may be defined by one orthogonal frequency division multiplexing (OFDM) symbol 1-02 on the time axis and one subcarrier 1-03 on the frequency axis. In the frequency domain, $N_{sc}^{RB}$ (e.g., 12) consecutive REs may form one resource block (RB) 1-04. In LTE, LTE-A, and LTE-A Pro, two slots each of which includes seven OFDM symbols are combined to form one subframe 1-10, and one subframe forms a transmission time interval (TTI) as a transmission unit in the time domain.

Figure 2:
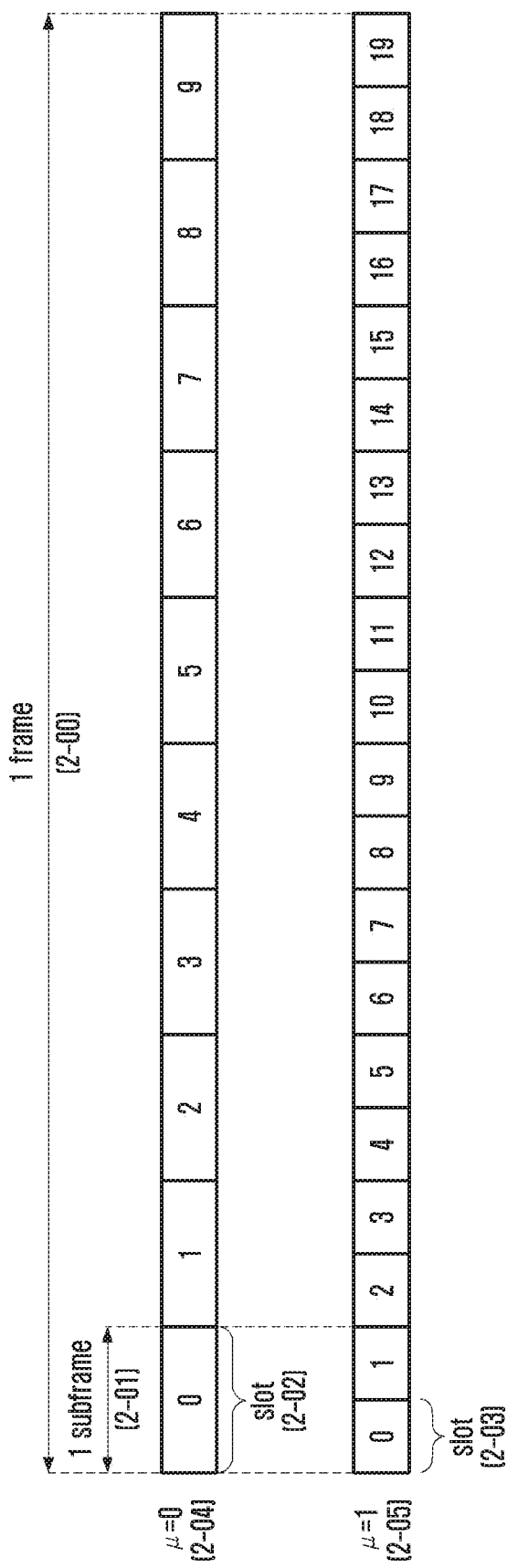
FIG. 2 illustrate structures of a frame, a subframe, and a slot in 5G according to an embodiment of the disclosure.

FIG. 2 illustrate a slot structure considered in a 5G system according to an embodiment of the disclosure.

Referring to FIG. 2 illustrates one example of structures of a frame 2-00, a subframe 2-01, and a slot 2-02. One frame 2-00 may be defined as 10 ms. One subframe 2-01 may be defined as 1 ms. Therefore, one frame 2-00 may include a total of ten subframes 2-01. One slot 2-02 and 2-03 may be defined as 14 OFDM symbols slot (i.e., number of symbols per slot ($N_{symb}^{slot}$)=14), and one slot forms a TTI. One subframe 2-01 may include one or a plurality of slots 2-02 and 2-03, and the number of slots 2-02 and 2-03 per subframe 2-01 may vary depending on a set subcarrier spacing value µ 2-04 and 2-05. In the example of FIG. 2, as the set subcarrier spacing value, µ=0 (2-04) and µ=1 (2-05). When µ=0 (2-04), one subframe 2-01 may include one slot 2-02; when µ=1 (2-05), one subframe 2-01 may include two slots 2-03. That is, the number of slots per subframe ($N_{slot}^{subframe,\mu}$) may vary depending on the set subcarrier spacing value µ, and the number of slots per frame ($N_{slot}^{frame,\mu}$) may vary accordingly. $N_{slot}^{subframe,\mu}$ and $N_{slot}^{frame,\mu}$ according to each subcarrier spacing setting µ may be defined as in Table 1.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In NR, one component carrier (CC) or serving cell can include up to 250 RBs. Therefore, when a UE always receives the entire serving cell bandwidth as in LTE, the power consumption of the UE may be extreme. To solve this problem, a base station may configure one or more bandwidth parts (BWP) for the UE, thus supporting the UE in changing a reception region in the cell. In NR, the base station may configure an initial BWP, which is the bandwidth of control resource set (CORESET) #0 (or a common search space: CSS), for the UE through a master information block (MIB). Subsequently, the base station may configure a first BWP for the UE through radio resource control (RRC) signaling and may report at least one piece of BWP configuration information that may be indicated through DCI in the future. The base station may report a BWP ID to the UE through DCI, thereby indicating a band for the UE to use. When the UE fails to receive the DCI in the currently allocated BWP for a specified time or longer, the UE returns to a default BWP and attempts to receive the DCI.

Figure 3:
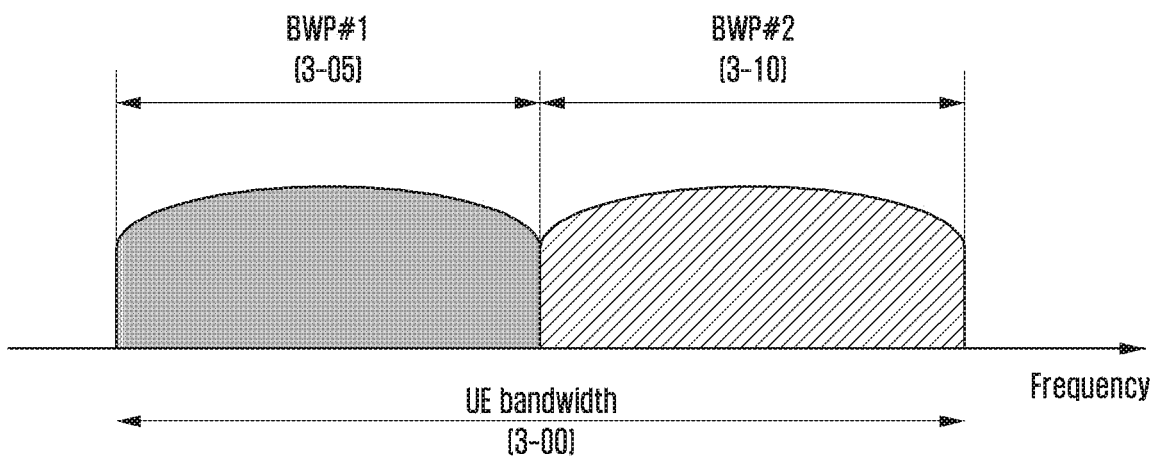
FIG. 3 illustrates an example of the configuration of a bandwidth part according to an embodiment of the disclosure.

FIG. 3 illustrates an example of the configuration of a BWP in a 5G communication system according to an embodiment of the disclosure.

Referring to FIG. 3 shows an example in which a UE bandwidth 3-00 is configured with two BWPs, that is, BWP #1 3-05 and BWP #2 3-10. A base station may configure one BWP or a plurality of BWPs for the UE and may configure information about each BWP as follows.

TABLE 2

Configuration information 1: Bandwidth of a BWP (the number of physical resource blocks (PRBs) included in the BWP)
Configuration information 2: Frequency position of a BWP (e.g., an offset value relative to reference point A, in which the reference point may be, for example, the center frequency of a carrier, a synchronization signal, a synchronization signal raster, or the like)
Configuration information 3: Numerology of a BWP (e.g., subcarrier spacing, cyclic prefix (CP) length, or the like)
Other information In addition to the above pieces of configuration information, various parameters related to the BWP may be configured for the UE. These pieces of information may be transmitted from the base station to the UE through higher-layer signaling, for example, RRC signaling. At least one of the one configured BWP or the plurality of configured BWPs may be activated. Whether to activate a configured BWP may be indicated from the base station to the UE semi-statically through RRC signaling or dynamically through a medium access control (MAC) control element (CE) or DCI.

The configuration of a BWP supported by the 5G communication system may be used for various purposes.

In one example, when a bandwidth supported by a UE is smaller than a system bandwidth, the configuration of a BWP may be used. For example, the frequency position of the BWP in Table 2 (configuration information 1 in Table 2) may be set for the UE, enabling the UE to transmit and receive data at a particular frequency position within the system bandwidth.

In another example, a base station may configure a plurality of BWPs for a UE in order to support different numerologies. For example, in order to support data transmission and reception using both a subcarrier spacing of 15 kHz and a subcarrier spacing of 30 kHz for a UE, two BWPs may be configured to use a subcarrier spacing of 15 kHz and a subcarrier spacing of 30 kHz, respectively. Different BWPs may be subjected to frequency division multiplexing (FDM). When the UE intends to transmit and receive data with particular subcarrier spacing, a BWP configured with the subcarrier spacing may be activated.

In still another example, a base station may configure BWPs having different bandwidths for a UE in order to reduce power consumption of the UE. For example, when a UE supports a very large bandwidth, for example, a bandwidth of 100 MHz, and always transmits and receives data in the bandwidth, the UE may consume great power. In particular, it is very inefficient in power consumption that the UE unnecessarily monitors a downlink control channel over the large bandwidth of 100 MHz even when there is no traffic. Therefore, in order to reduce power consumption of the UE, the base station may configure a BWP having a relatively small bandwidth, for example, a BWP of 20 MHz, for the UE. The UE may perform a monitoring operation in the 20-MHz BWP in the absence of traffic, and the UE may transmit and receive data using the 100-MHz bandwidth according to an indication from the base station when the data is generated.

Figure 4:
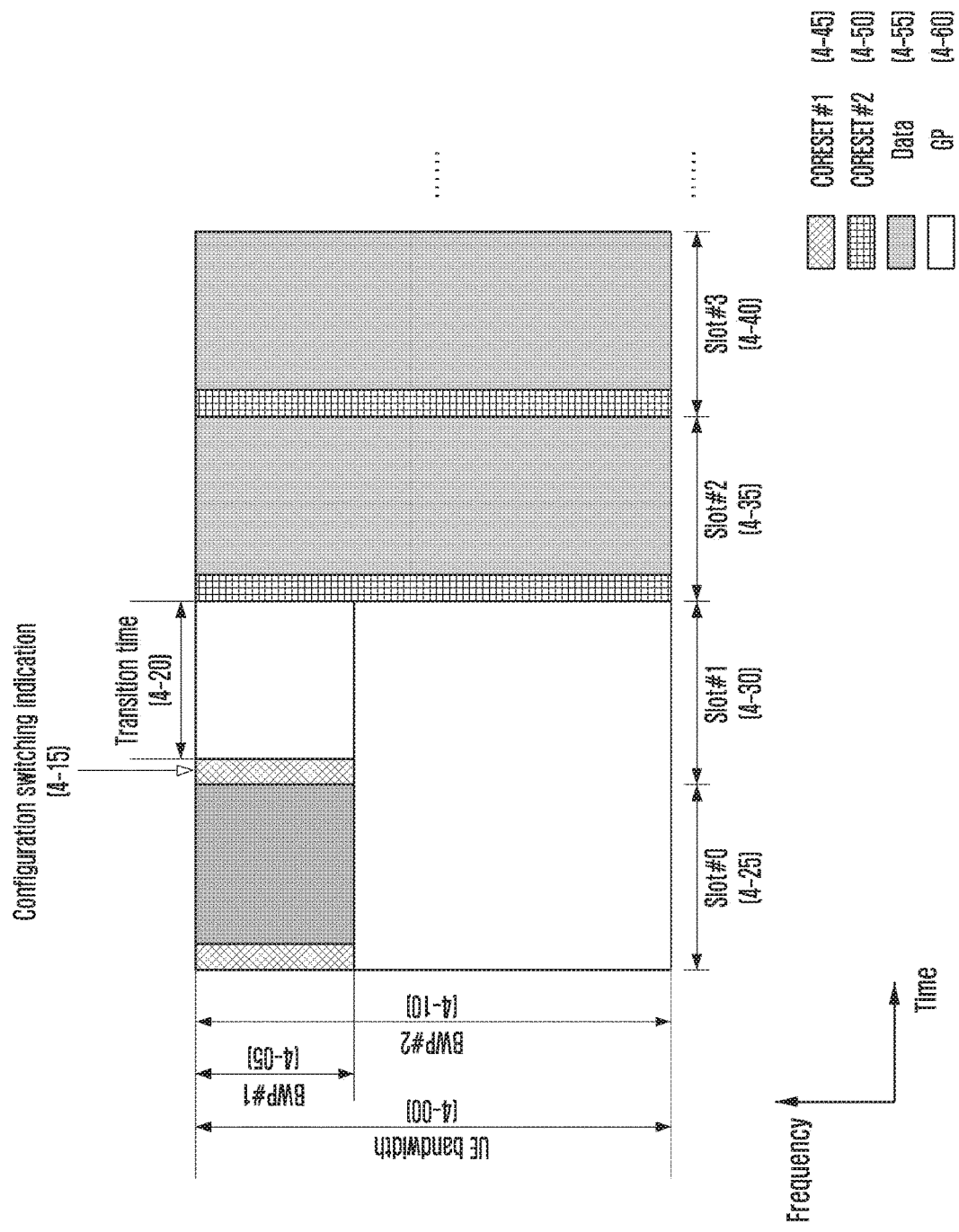
FIG. 4 illustrates an example of indicating and changing a bandwidth part according to an embodiment of the disclosure.

FIG. 4 illustrates a method of dynamically changing the configuration of a BWP according to an embodiment of the disclosure.

As described in Table 2, a base station may configure one BWP or a plurality of BWPs for a UE and may report, as the configuration of each BWP, information about the bandwidth of the BWP, the frequency position of the BWP, and the numerology of the BWP. FIG. 4 shows an example in which two BWPs, which are BPW #1 4-05 and BWP #2 4-10, are configured in a UE bandwidth 4-00 for one UE. One or a plurality of the configured BWPs may be activated, and FIG. 4 shows an example in which one BWP is activated. Referring to FIG. 4, BWP #1 4-05 of the configured BWPs is activated in slot #0 4-25, and the UE may monitor a physical downlink control channel (PDCCH) in control region 1 4-45 configured in BWP #1 4-05 and may transmit and receive data 4-55 in BWP #1 4-05. The control region in which the UE receives the PDCCH may vary according to which BWP is activated among the configured BWPs, and thus the bandwidth in which the UE monitors the PDCCH may vary.

The base station may further transmit an indicator for switching the configuration of a BWP to the UE. Here, switching the configuration of a BWP may be considered the same as activating a particular BWP (e.g., switching an activated BWP from BWP A to BWP B). The base station may transmit a configuration switching indicator to the UE in a particular slot. After receiving the configuration switching indicator from the base station, the UE may determine a BWP to be activated by applying a changed configuration according to the configuration switching indicator from a particular time and may monitor a PDCCH in a control region configured in the activated BWP.

Referring to FIG. 4, the base station may transmit a configuration switching indicator 4-15 indicating a switch of the activated BWP from existing BWP #1 4-05 to BWP #2 4-10 to the UE in slot #1 4-30. After receiving the indicator, the UE may activate BWP #2 4-10 according to the content of the indicator. Here, a transition time 4-20 for a BWP switch may be required for the UE, and the time to switch and apply a BWP to be activated may be determined according to the transition time. Referring to FIG. 4, a transition time 4-20 of one slot is required after receiving the configuration switching indicator 4-15. Data transmission and reception may not be performed in the transition time, that is, a guard period (GP) 4-60 may be set. Accordingly, BWP #2 4-10 may be activated in slot #2 4-35, and thus the UE may transmit and receive a control channel 4-50 and data 4-55 via the BWP in slot #2 4-35 and slot #3 4-40.

The base station may pre-configure one BWP or a plurality of BWPs for the UE via upper-layer signaling (e.g., RRC signaling) and may indicate activation by mapping the configuration switching indicator 4-15 with one of BWP configurations preconfigured by the base station. For example, a log 2N-bit indicator may indicate one BWP selected from among N preconfigured BWPs. Table 3 shows an example of indicating configuration information about a BWP using a two-bit indicator.

TABLE 3

| Indicator value | BWP configuration |
| --- | --- |
| 00 | Bandwidth configuration A configured via upper-layer signaling |
| 01 | Bandwidth configuration B configured via upper-layer signaling |
| 10 | Bandwidth configuration C configured via upper-layer signaling |
| 11 | Bandwidth configuration D configured via upper-layer signaling |

The foregoing configuration switching indicator 4-15 for the BWP may be transmitted from the base station to the UE via MAC CE signaling or L1 signaling (e.g., common DCI, group-common DCI, or UE-specific DCI).

The time to apply BWP activation according to the foregoing configuration switching indicator 4-15 for the BWP depends on the following. The time to apply a configuration switch to the UE may depend on a predefined value (e.g., the configuration switch is applied after N (≥1) slots since receiving the configuration switching indicator), may set by the base station for the UE via upper-layer signaling (e.g., RRC signaling), or may be transmitted via the configuration switching indicator 4-15. Further, the time to apply the configuration switch may be determined by combining two or more of the above methods. After receiving the configuration switching indicator 4-15 for the BWP, the UE may apply a switched configuration from the time obtained by the above method.

Hereinafter, a downlink control channel in a 5G communication system will be described in detail with reference to a drawing.

Figure 5:
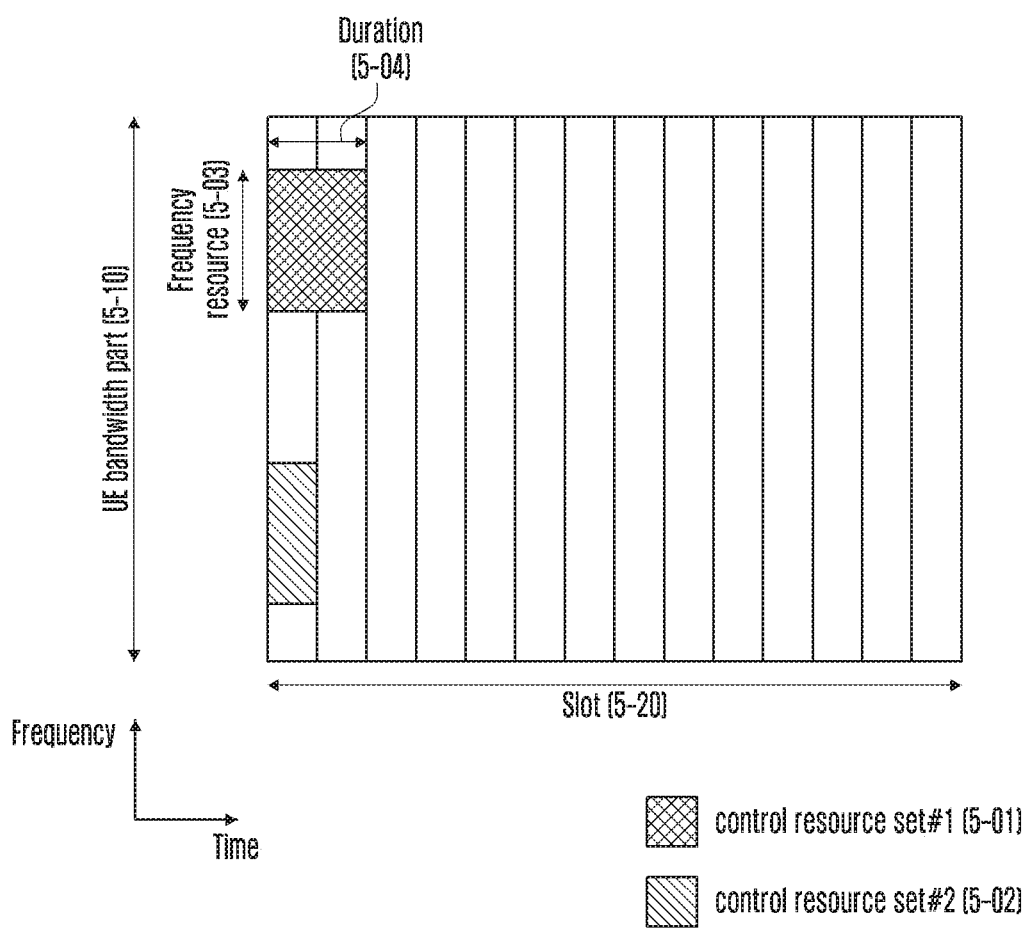
FIG. 5 illustrates an example of a control-region configuration of a downlink control channel according to an embodiment of the disclosure.

FIG. 5 illustrates an example of a control region (i.e., CORESET) in which a downlink control channel is transmitted in a 5G wireless communication system according to an embodiment of the disclosure.

FIG. 5 shows an example in which a UE BWP 5-10 is configured on the frequency axis and two control regions (control region #1 5-01 and control region #2 5-02) are configured in one slot 5-20 on the time axis. Control region #1 5-01 and control region #2 5-02 may be configured in a particular frequency resource 5-03 in the entire UE BWP 5-10 on the frequency axis. Each control region may be configured with one or a plurality of OFDM symbols on the time axis, which may be defined as control region set duration 5-04.

Referring to FIG. 5, control region #1 5-01 is configured with a control resource set duration of two symbols, and control region #2 5-02 is configured with a control resource set duration of one symbol.

The control region in 5G described above may be configured by the base station for the UE through upper-layer signaling (e.g., system information, an MIB, or RRC signaling). Configuring a control region for the UE means that the base station provides the UE with information, such as the identity of the control region, a frequency position of the control region, the symbol duration of the control region, or the like. For example, the configuration of a control region may include pieces of information illustrated in Table 4.

TABLE 4

```
ControlResourceSet ::=            SEQUENCE {
    --Corresponds to L1 parameter 'CORESET-ID'
    controlResourceSetId        ,
    (Control region identity)
    frequencyDomainResources    BIT STRING (SIZE (45)),
    (Frequency-domain resource allocation information)
    duration                    INTEGER (1..maxCoReSetDuration),
    (Time-domain resource allocation information)
        cce-REG-MappingType     CHOICE {
    (CCE-to-REG mapping type)
            interleaved         SEQUENCE {
                reg-Bundle Size ENUMERATED {n2, n3,
n6},
            (REG bundle size)
                precoderGranularity ENUMERATED
{sameAsREG-bundle, allContiguousRBs},
                interleaverSize ENUMERATED {n2, n3, n6}
                (Interlever size)
                shiftindex
            INTEGER(0..maxNrofPhysicalResourceBlocks-1)
                OPTIONAL
                (Interlever shift)
            },
        nonInterleaved          NULL
        },
```

TABLE 4-continued

| tci-StatesPDCCH StatesPDCCH)) OF TCI-StateId (QCL configuration information) tci-PresentInDCI | SEQUENCE(SIZE (1..maxNrofTCI-OPTIONAL, ENUMERATED {enabled} OPTIONAL, -- Need S |
|---|---|
| } | |

In Table 4, tci-StatesPDCCH (hereinafter, simply referred to as a transmission configuration indicator (TCI) state) configuration information may include information about the index of one or a plurality of synchronization signals (SSs)/physical broadcast channel (PBCH) blocks in a quasi co-located (QCL) relationship with a demodulation reference signal (DMRS) transmitted in the control region or the index of a channel state information reference signal (CSI-RS).

Hereinafter, methods of allocating time and frequency resources for data transmission in NR will be described.

NR provides the following specific frequency-domain resource allocations (FD-RAs) in addition to frequency-domain resource candidate allocation through a BWP indication illustrated above.

Figure 6:
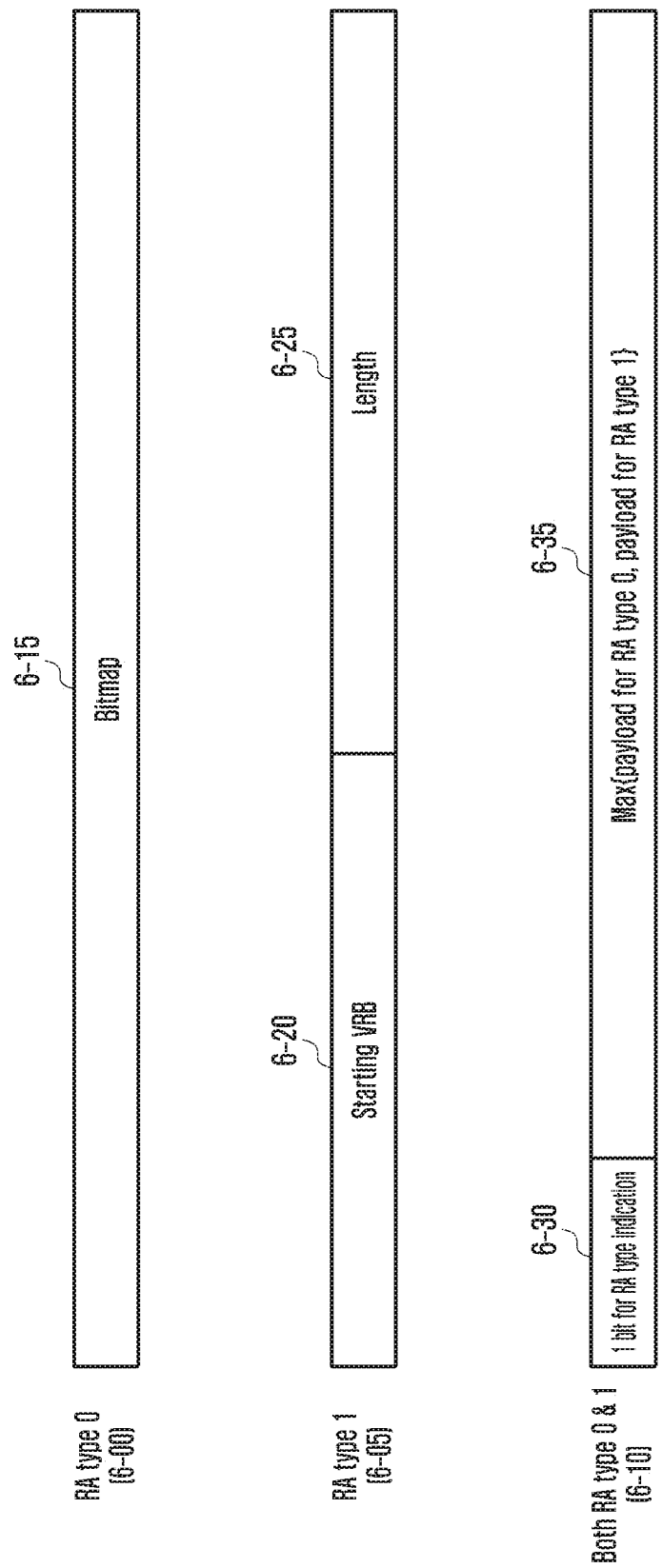
FIG. 6 illustrates an example of frequency-domain resource allocation of a physical downlink shared channel (PDSCH) according to an embodiment of the disclosure.

FIG. 6 illustrates three frequency-domain resource allocation methods of type 0 6-00, type 1 6-05, and a dynamic switch 6-10 that may be configured through an upper layer in NR according to an embodiment of the disclosure.

Referring to FIG. 6, when a UE is configured to use only resource type 0 through upper-layer signaling (6-00), some downlink control information (DCI) for allocating a PDSCH to the UE has a bitmap of $N_{RBG}$ bits, a condition for which will be described later. Here, $N_{RBG}$ denotes the number of resource block groups (RBGs) determined as in Table 4 according to a BWP size allocated by a BWP indicator and a upper-layer parameter rbg-Size, and the RBG phase indicated by 1 by the bitmap, and data is transmitted on an RBG indicated by 1 according to the bitmap.

TABLE 5

| BWP Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the UE is configured to use only resource type 1 6-05 through upper-layer signaling, some DCI for allocating a PDSCH to the UE has frequency-domain resource allocation information of $\lceil \log_2(N_{RB}^{DL,BWP}(N_{RB}^{DL,BWP}+1)/2) \rceil$ bits, a condition for which will be described later. Through this information, the base station can configure a starting virtual resource block (VRB) 6-20 and the length 6-25 of frequency-domain resources consecutively allocated therefrom.

When the UE is configured to use both resource type 0 and resource type 1 through upper-layer signaling (6-10), some DCIs for allocating a PDSCH to the UE has frequency-domain resource allocation information of bits of a greater value 6-35 among a payload 6-15 for configuring resource type 0 and payloads 6-20 and 6-25 for configuring resource type 1, a condition for which will be described later. Here, one bit 6-30 is added to the most significant bit (MSB) of the frequency-domain resource allocation information in the DCI, in which 0 indicates that resource type 0 is used, and 1 indicates that resource type 1 is used.

Figure 7:
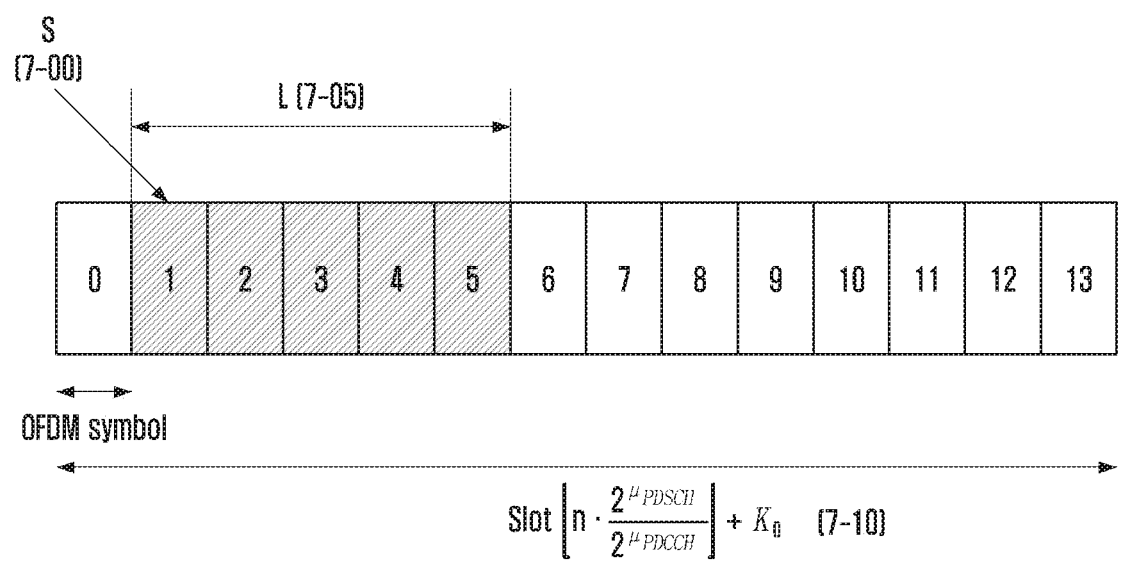
FIG. 7 illustrates an example of time-domain resource allocation of a PDSCH according to an embodiment of the disclosure.

FIG. 7 illustrates an example of time-domain resource allocation in NR according to an embodiment of the disclosure.

Referring to FIG. 7, a base station can indicate a time-domain position of a PDSCH resource allocated to a UE according to the start position 7-00 and the length 7-05 of an OFDM symbol in a slot 7-10 dynamically indicated based on the subcarrier spacing ($\mu_{PDSCH}$, $\mu_{PDCCH}$) of a data channel and a control channel configured via an upper layer, a scheduling offset ($K_0$) value, and DCI.

Figure 8:
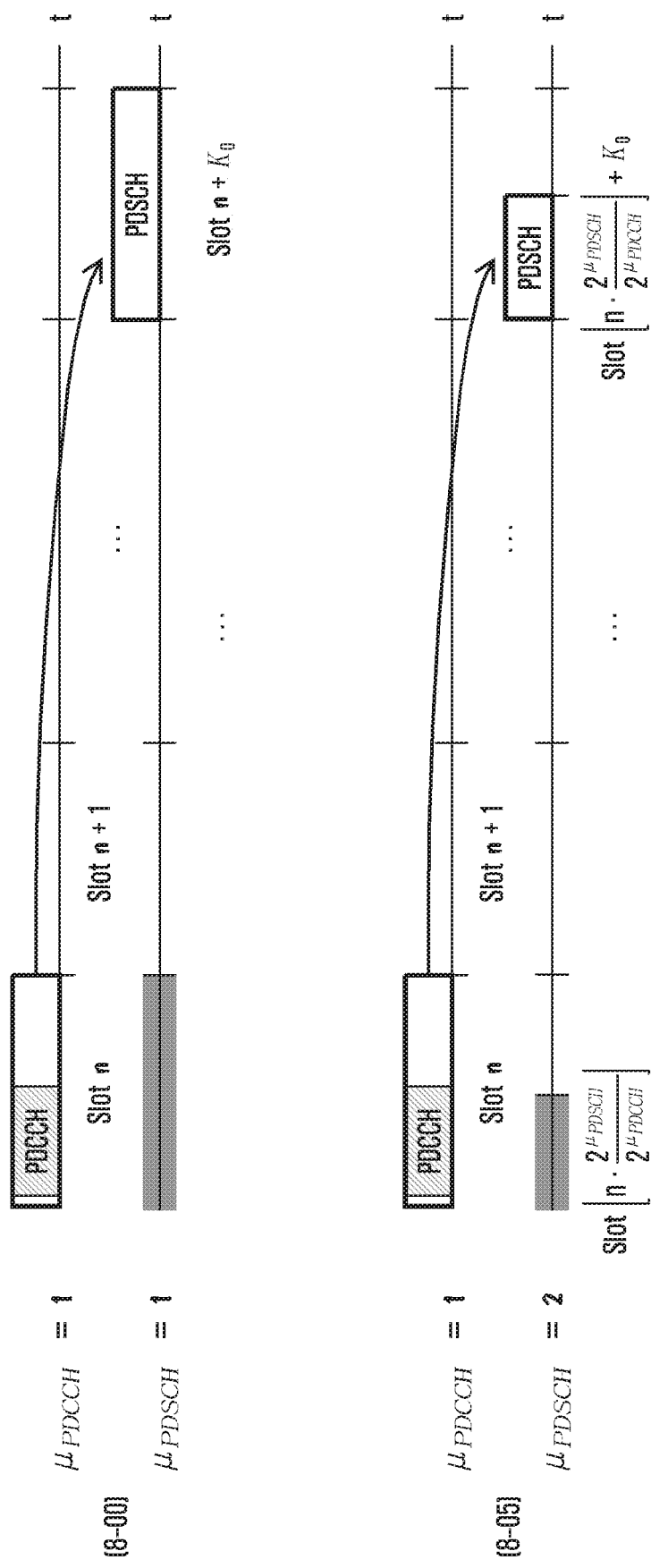
FIG. 8 illustrates an example of time-domain resource allocation of a PDSCH according to an embodiment of the disclosure.

FIG. 8 illustrates an example of time-domain resource allocation according to the subcarrier spacing of a data channel and a control channel according to an embodiment of the disclosure.

Referring to FIG. 8, when a data channel and a control channel have the same subcarrier spacing (8-00, $\mu_{PDSCH}=\mu_{PDCCH}$), since a data slot number and a control slot number are the same, a base station and a UE recognize that a scheduling offset occurs in accordance with predetermined slot offset $K_0$. When the subcarrier spacing of the data channel and the subcarrier spacing of the control channel are different (8-05, $\mu_{PDSCH}\neq\mu_{PDCCH}$), since a data slot number and a control slot number are different, the base station and the UE recognize that a scheduling offset occurs in accordance with predetermined slot offset $K_0$ based on the subcarrier spacing of the PDCCH.

In NR, for efficient control channel reception of a UE, various types of DCI formats as shown in Table 6 are provided according to purposes.

TABLE 6

| DCI format | Usage |
|---|---|
| 0_0 | Scheduling of physical uplink shared channel (PUSCH) in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for physical uplink control channel (PUCCH) and PUSCH |
| 2_3 | Transmission of a group of TPC commands for SRS transmissions by one or more UEs |

For example, the base station may use DCI format 1_0 or DCI format 1_1 to schedule a PDSCH for one cell.

DCI format 0_1 includes at least the following pieces of information when transmitted together with a CRC scrambled with a cell radio network temporary identifier (C-RNTI), a configured scheduling RNTI (CS-RNTI), or a new-RNTI.

Identifier for DCI formats (1 bit): DCI format indicator, which is always set to 1.

Frequency domain resource assignment ($N_{RBG}$ bits or $\lceil \log_2(N_{RB}^{DL,BWP}(N_{RB}^{DL,BWP}+1)/2) \rceil$ bits): Indicates frequency-domain resource allocation. When DCI format 1_0 is monitored in a UE-specific search space, $N_{RB}^{DL,BWP}$ is the size of an active DL BWP; otherwise, $N_{RB}^{DL,BWP}$ is the size of an initial DL BWP. $N_{RBG}$ is the number of resource block groups. A detailed method is illustrated in the foregoing frequency-domain resource allocation.

Time domain resource assignment (0 to 4 bits): Indicates time-domain resource allocation according to the foregoing description.

VRB-to-PRB mapping (1 bit): 0 indicates non-interleaved VRP-to-PRB mapping, and 1 indicates interleaved VRP-to-PRB mapping.

Modulation and coding scheme (5 bits): Indicates a modulation order and a coding rate used for PDSCH transmission.

New data indicator (1 bit): Indicates whether a PDSCH corresponds to initial transmission or retransmission depending on toggling.

Redundancy version (2 bits): Indicates a redundancy version used for PDSCH transmission.

Hybrid automatic repeat request (HARQ) process number (4 bits): Indicates an HARQ process number used for PDSCH transmission.

Downlink assignment index (DAI) (2 bits): DAI indicator.

Transmit power control (TPC) command for scheduled PUCCH (2 bits): PUCCH power control indicator.

PUCCH resource indicator (3 bits): PUCCH resource indicator, which indicates one of eight resources configured via an upper layer.

PDSCH-to-HARQ_feedback timing indicator (3 bits): HARQ feedback timing indicator, which indicates one of eight feedback timing offsets configured via an upper layer.

DCI format 1_1 includes at least the following pieces of information when transmitted together with a CRC scrambled with a cell radio network temporary identifier (C-RNTI), a configured scheduling RNTI (CS-RNTI), or a new-RNTI.

Identifier for DCI formats (1 bit): DCI format indicator, which is always set to 1.

Carrier indicator (0 or 3 bits): Indicates a CC (or cell) in which a PDSCH allocated by DCI is transmitted.

Bandwidth part indicator (0, 1, or 2 bits): Indicates a BWP in which a PDSCH allocated by DCI is transmitted.

Frequency domain resource assignment (payload is determined according to the foregoing frequency-domain resource allocation): Indicates frequency-domain resource allocation. $N_{RB}^{DL,BWP}$ is the size of an active DL BWP. A detailed method is illustrated in the foregoing frequency-domain resource allocation.

Time domain resource assignment (0 to 4 bits): Indicates time-domain resource allocation according to the foregoing description.

VRB-to-PRB mapping (0 or 1 bit): 0 indicates non-interleaved VRP-to-PRB mapping, and 1 indicates interleaved VRP-to-PRB mapping. When frequency-domain resource allocation is set to resource type 0, this information is 0 bits.

PRB bundling size indicator (0 or 1 bit): When upper-layer parameter prb-BundlingType is not set or is set to 'static', this information is 0 bits; when upper-layer parameter prb-BundlingType is set to 'dynamic', this information is 1 bit.

Rate matching indicator (0, 1, or 2 bits): Indicates a rate matching pattern.

Zero power (ZP) CSI-RS trigger (0, 1, or 2 bits): Indicator triggering an aperiodic ZP CSI-RS.

For transport block 1:
  Modulation and coding scheme (5 bits): Indicates a modulation order and a coding rate used for PDSCH transmission.
  New data indicator (1 bit): Indicates whether a PDSCH corresponds to initial transmission or retransmission depending on toggling.
  Redundancy version (2 bits): Indicates a redundancy version used for PDSCH transmission.

For transport block 2:
  Modulation and coding scheme (5 bits): Indicates a modulation order and a coding rate used for PDSCH transmission.
  New data indicator (1 bit): Indicates whether a PDSCH corresponds to initial transmission or retransmission depending on toggling.
  Redundancy version (2 bits): Indicates a redundancy version used for PDSCH transmission.

HARQ process number (4 bits): Indicates an HARQ process number used for PDSCH transmission.

Downlink assignment index (0, 2, or 4 bits): DAI indicator.

TPC command for scheduled PUCCH (2 bits): PUCCH power control indicator.

PUCCH resource indicator (3 bits): PUCCH resource indicator, which indicates one of eight resources configured via an upper layer.

PDSCH-to-HARQ_feedback timing indicator (3 bits): HARQ feedback timing indicator, which indicates one of eight feedback timing offsets configured via an upper layer.

Antenna port (4, 5, or 6 bits): Indicates a DMRS port and a code divisional multiplexing (CDM) group without data.

Transmission configuration indication (0 or 3 bits): TCI indicator.

Sounding reference signal (SRS) request (2 or 3 bits): SRS transmission request indicator.

Code block group (CBG) transmission information (0, 2, 4, 6, or 8 bits): Indicator indicating whether code block groups in an allocated PDSCH are transmitted. 0 indicates that the CBGs are not transmitted, and 1 indicates that the CBGs are transmitted.

CBG flushing-out information (0 or 1 bit): Indicator indicating whether previous CBGs are contaminated. 0 indicates that the CBGs may be contaminated, and 1 indicates that the CBGs may be combinable in retransmission reception.

DMRS sequence initialization (0 or 1 bit): DMRS scrambling ID selection indicator.

The number of pieces of DCI having different sizes that a UE can receive per slot in a cell is up to 4. The number of pieces of DCI having different sizes scrambled with a C-RNTI that a UE can receive per slot in a cell is up to 3.

Figure 9:
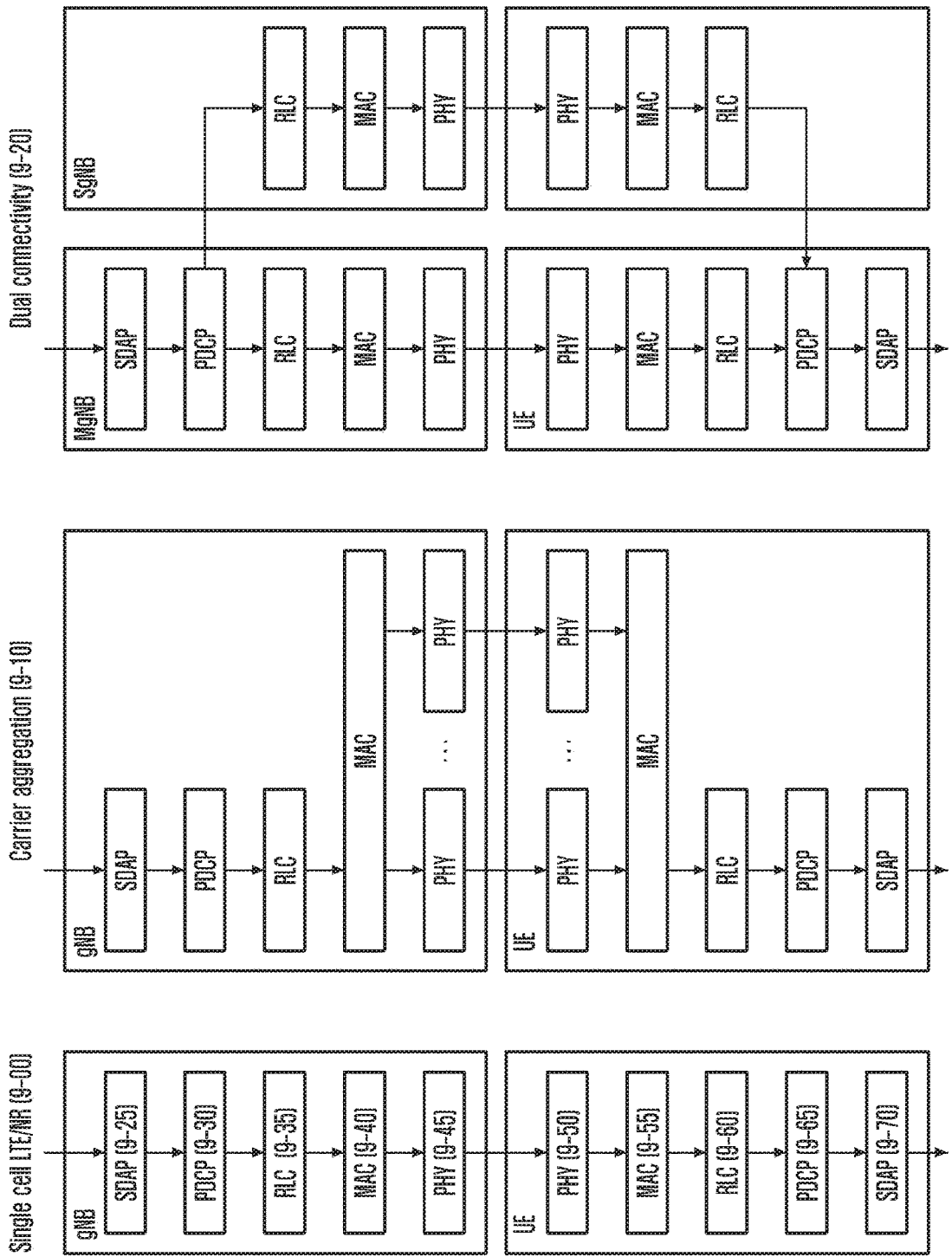
FIG. 9 illustrates the protocol stacks of a base station and a UE when single cell, carrier aggregation, dual connectivity are performed according to an embodiment of the disclosure.

FIG. 9 illustrates the wireless protocol structures of a base station and a UE when single cell 9-00, carrier aggregation (CA) 9-10, dual connectivity (DC) 9-20 are performed according to an embodiment of the disclosure.

Referring to FIG. 9, a wireless protocol of a next-generation mobile communication system includes NR service data adaptation protocols (SDAPs) 9-25 and 9-70, NR packet data convergence protocols (PDCPs) 9-30 and 9-65, NR radio link controls (RLCs) 9-35 and 9-60, and NR medium access controls (MACs) 9-40 and 9-55 respectively at a UE and an NR base station.

Main functions of the NR SDAPs 9-25 and 9-70 may include some of the following functions.

Transfer of user plane data
    Mapping between QoS flow and DRB for both DL and UL
    Marking QoS flow ID in both DL and UL packets
    Reflective QoS flow-to-DRB mapping for UL SDAP PDUs Regarding the SDAP-layer devices, the UE may receive a configuration about whether to use a header of the SDAP-layer devices or whether to use a function of the SDAP-layer devices for each PDCP-layer device, each bearer, or each logical channel via an RRC message. When an SDAP header is configured, a one-bit NAS QoS reflective indicator (NAS reflective QoS) and a one-bit AS QoS reflective indicator (AS reflective QoS) of the SDAP header may be used for indication to enable the UE to update or reconfigure uplink and downlink QoS flows and mapping information for a data bearer. The SDAP header may include QoS flow ID information indicating QoS. The QoS information may be used as a data processing priority, scheduling information, and the like in order to support a desired service.

Main functions of the NR PDCPs 9-30 and 9-65 may include some of the following functions.

Header compression and decompression (ROHC only)
    Transfer of user data
    In-sequence delivery of upper-layer PDUs
    Out-of-sequence delivery of upper-layer PDUs
    PDCP PDU reordering for reception
    Duplicate detection of lower-layer SDUs
    Retransmission of PDCP SDUs
    Ciphering and deciphering
    Timer-based SDU discard in uplink.

Among the above functions, the reordering function of the NR PDCP devices refers to a function of rearranging PDCP PDUs received in a lower layer in order based on the PDCP sequence number (SN) and may include a function of transmitting the data to an upper layer in the order of rearrangement or a function of immediately transmitting the data regardless of order. In addition, the reordering function may include a function of recording lost PDCP PDUs via reordering, may include a function of reporting the state of lost PDCP PDUs to a transmitter, and may include a function of requesting retransmission of lost PDCP PDUs.

Main functions of the NR RLCs 9-35 and 9-60 may include some of the following functions.

Transfer of upper-layer PDUs
    In-sequence delivery of upper-layer PDUs
    Out-of-sequence delivery of upper-layer PDUs
    Error Correction through ARQ
    Concatenation, segmentation, and reassembly of RLC SDUs
    Re-segmentation of RLC data PDUs
    Reordering of RLC data PDUs
    Duplicate detection
    Protocol error detection
    RLC SDU discard
    RLC re-establishment Among the above functions, the in-sequence delivery function of the NR RLC devices refers to a function of delivering RLC SDUs received from a lower layer to an upper layer in order, and may include a function of reassembling and delivering a plurality of RLC SDUs when one original RLC SDU is divided into the plurality of RLC SDUs to be received. Further, the in-sequence delivery function may include a function of rearranging received RLC PDUs based on the RLC SN or the PDCP SN and may include a function of recording lost RLC PDUs via reordering. In addition, the in-sequence delivery function may include a function of reporting the state of lost RLC PDUs to a transmitter, may include a function of requesting retransmission of lost RLC PDUs, and, if there is a lost RLC SDU, may include a function of delivering only RLC SDUs before the lost RLC SDU to an upper layer in order. Furthermore, the in-sequence delivery function may include a function of delivering all RLC SDUs, received before a timer starts, to an upper layer in order when the timer has expired despite the presence of a lost RLC SDU, or may include a function of delivering all RLC SDUs received so far to an upper layer in order when the timer expires despite the presence of a lost RLC SDU. Further, the NR RLC devices may process RLC PDUs in order of reception (the order of arrival regardless of the order of SNs) and may deliver the RLC PDUs to the PDCP devices in an out-of-sequence manner. For a segment, the NR RLC devices may receive segments that are stored in a buffer or are to be received later, may reconstruct the segment into one whole RLC PDU, may process the RLC PDU, and may deliver the RLC PDU to the PDCP devices. The NR RLC layers may not include a concatenation function, and the concatenation function may be performed in the NR MAC layers or may be replaced with a multiplexing function of the NR MAC layers.

The out-of-sequence delivery function of the NR RLC devices refers to a function of delivering RLC SDUs received from a lower layer directly to an upper layer regardless of order, and may include a function of reassembling and delivering a plurality of RLC SDUs when one original RLC SDU is divided into the plurality of RLC SDUs to be received. In addition, the out-of-sequence delivery function may include a function of recording lost RLC PDUs by storing and reordering the RLC SNs or PDCP SNs of received RLC PDUs.

The NR MACs 9-40 and 9-55 may be connected to a plurality of NR RLC-layer devices configured in one device, and main functions of the NR MACs may include some of the following functions.

Mapping between logical channels and transport channels
    Multiplexing/demultiplexing of MAC SDUs
    Scheduling information reporting
    Error correction through HARQ
    Priority handling between logical channels of one UE
    Priority handling between UEs by means of dynamic scheduling
    MBMS service identification
    Transport format selection
    Padding NR PHY layers 9-45 and 9-50 may perform channel coding and modulation of upper-layer data and convert the data into OFDM symbols to transmit the OFDM symbols via a wireless channel, or demodulate OFDM symbols received via a wireless channel and perform channel decoding of the OFDM symbols to deliver the OFDM symbols to an upper layer.

Details of the wireless protocol structures may be changed variously according to a carrier (or cell) operating method. For example, when the base station transmits data to the UE based on a single carrier (or cell), the base station and the UE use a protocol structure having each layer with a single structure as in 9-00. When the base station transmits data to the UE based on carrier aggregation (CA) using multiple carriers at a single TRP, the base station and the UE use a protocol structure in which up to an RLC has a single structure but PHY layers are multiplexed through a MAC layer as in 9-10. In another example, when the base station transmits data to the UE based on connectivity (DC) using multiple carriers at a plurality of TRPs, the base station and the UE use a protocol structure in which up to an RLC has a single structure but PHY layers are multiplexed through MAC layers as in 9-20.

Referring to details of PDSCH transmission/reception procedures, such as the DCI structures, the PDSCH time/frequency resource allocation, and the wireless protocol structures described above, an NR system of Release 15 focuses on allocation of a PDSCH transmitted from a single transmission point. Thus, in coordinated communication in which one UE receives PDSCHs transmitted from a plurality of points, it is required to support an additional standard. For example, in current NR, when two or more PDSCHs are scheduled for a UE in the same transmission band and overlapping time periods, the UE is not forced to decode all of the PDSCHs (except in a special case where a PDSCH for transmitting a system information block (SIB) is included or the like). Further, in current NR, when two or more PDSCHs are scheduled in overlapping time periods, the UE assumes that the PDSCHs may have different priorities. Therefore, in this case, a particular UE may operate to decode only a PDSCH having a high priority. However, in coordinated communication, since a UE needs to decode all PDSCHs transmitted from a plurality of points, an existing standard related to PDSCH priority needs to be extended. In addition, the UE requires a high-performance receiver for PDSCH reception from a plurality of TRPs and involves high UE complexity in order to support coordinated communication. Therefore, there is a need for a method for reducing UE complexity for supporting coordinated communication.

The disclosure illustrates embodiments of improving efficiency in coordinated communication by providing a PDSCH prioritizing method and a method for reducing UE reception complexity in view of coordinated communication.

The following details are applicable to frequency division duplex (FDD) and time division duplex (TDD) systems.

In the following disclosure, upper-layer signaling is a method of signal transmission from a base station to a UE using a downlink data channel of a physical layer or from a UE to a base station using an uplink data channel of a physical layer and may also be referred to as RRC signaling, PDCP signaling, or an MAC control element (CE).

In the following disclosure, in determining whether coordinated communication is applied, a UE can use various methods, such as allowing a PDCCH(s) for allocating a PDSCH to which coordinated communication is applied to have a specific format, allowing a PDCCH(s) for allocating a PDSCH to which coordinated communication is applied to include a specific indicator indicating whether communication is applied, scrambling a PDCCH(s) for allocating a PDSCH to which coordinated communication is applied with a specific RNTI, or assuming that coordinated communication is applied in a specific period indicated via an upper layer. Hereinafter, for convenience of description, a UE receiving a PDSCH to which coordinated communication is applied based on conditions similar to the above is referred to as a non-coherent joint transmission (NC-JT) case.

In the following disclosure, prioritizing A and B may be construed in various ways, for example, as selecting a higher priority according to a predetermined priority rule to perform an operation corresponding thereto or as omitting, skipping, or dropping an operation corresponding to a lower priority.

In the following disclosure, examples of the above will be described with reference to a plurality of embodiments, which may not be independent, and it is possible to apply one or more embodiments simultaneously or in combination.

First Embodiment: Multiple DCI Reception for NC-JT

Unlike conventional systems, a 5G wireless communication system can support not only services requiring a high transmission rate but also services having a very short transmission delay and services requiring a high connection density. In a wireless communication network including a plurality of cells, TRPs, or beams, coordinated transmission between cells, TRPs, and/or beams is one elementary technique for satisfying the foregoing various service requirements by increasing the strength of a signal received by a UE or efficiently controlling interference between cells, TRPs, and/or beams.

Joint transmission (JT) is a representative transmission technique for coordinated communication and supports one UE through different cells, TRPs, or/and beams, thus increasing the strength of a signal received by the UE. Since channels between a UE and individual cells, TRPs, or/and beams may have significantly different characteristics, different types of precoding, modulation and coding schemes (MCSs), resource allocation, and the like need to be applied to links between the UE and the individual cells, TRPs, or/and beams. Particularly, in non-coherent joint transmission (NC-JT), which supports non-coherent precoding for each cell, TRP, or/and beam, it is important to configure individual DL transmission information for each cell, TRP, or/and beam. The configuration of the individual DL transmission information for each cell, TRP, or/and beam is a major factor to increase payload necessary for DL DCI transmission, which may adversely affect the reception performance of a PDCCH for transmitting the DCI. Therefore, it is necessary to carefully design a tradeoff between the amount of DCI and the reception performance of a PDCCH in order to support JT.

Figure 10:
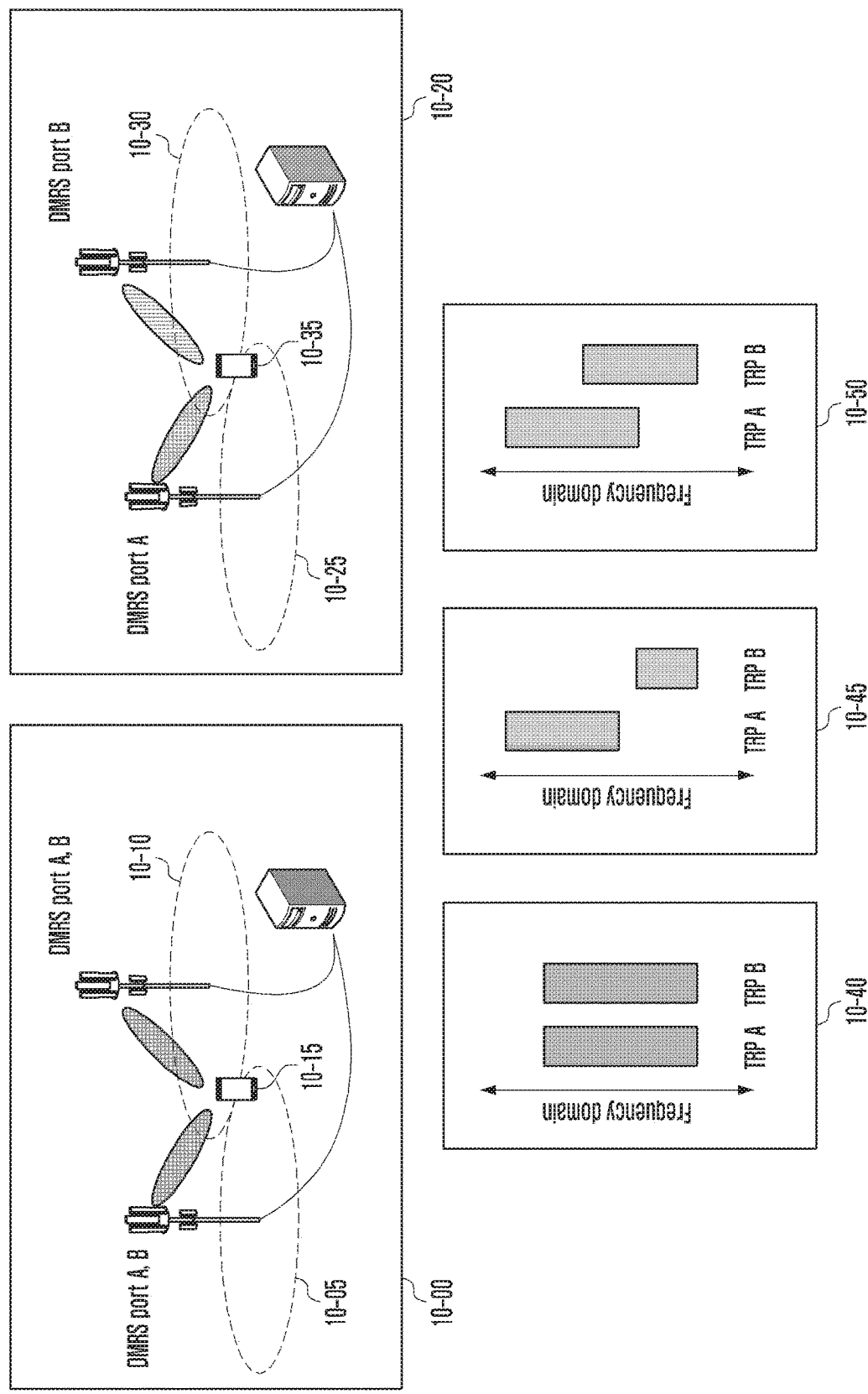
FIG. 10 illustrates examples of a coordinated-communication antenna port configuration and resource allocation according to an embodiment of the disclosure.

FIG. 10 illustrates examples of radio resource allocation per TRP according to a JT technique and a situation according to an embodiment of the disclosure.

Referring to FIG. 10, 10-00 illustrates coherent joint transmission (C-JT) supporting coherent precoding between individual cells, TRPs, or/and beams. In C-JT, TRP A 10-05 and TRP B 10-10 transmit the same data (or PDSCH) to a UE 10-15, and a plurality of TRPs performs joint precoding, which means that TRP A 10-05 and TRP B 10-10 transmit the same DMRS ports (e.g., both TRPs transmit DMRS ports A and B) for receiving the same PDSCH. In this case, the UE 10-15 receives one piece of DCI for receiving one PDSCH demodulated by DMRS ports A and B.

Referring to FIG. 10, 10-20 illustrates non-coherent joint transmission (NC-JT) supporting non-coherent precoding between individual cells, TRPs, or/and beams. In NC-JT, the individual cells, TRPs, or/and beams transmit different data (or PDSCHs), and individual precoding may be applied to each data (or PDSCH), which means that TRP A 10-25 and TRP B 10-30 transmit different DMRS ports (e.g., TRP A transmits DMRS port A and TRP B transmits DMRS port B) for receiving the different PDSCHs to a UE 10-35. In this case, the UE 10-35 receives two types of DCI for receiving PDSCH A demodulated by DMRS port A and PDSCH B demodulated by DMRS port B.

For example, in NC-JT, as illustrated at the bottom of FIG. 10, various radio resource allocations may be considered, such as where the same frequency and time resources are used by a plurality of TRPs (10-40), where frequency and time resources used by a plurality of TRPs never overlap (10-45), and where frequency and time resources used by a plurality of TRPs partially overlap (10-50). Particularly, in the case of 10-50, DCI payload necessary for resource allocation information linearly increases according to the number of TRPs. This increase in DL DCI payload may adversely affect the reception performance of a PDCCH for transmitting DCI or may, as described above, significantly increase the DCI blind decoding complexity of a UE. Therefore, the disclosure provides a PDSCH time and frequency resource allocation method for efficiently supporting NC-JT.

For supporting NC-JT, pieces of DCIs in various forms, structures, and relationships may be considered to simultaneously allocate a plurality of PDSCHs to one UE.

Figure 11:
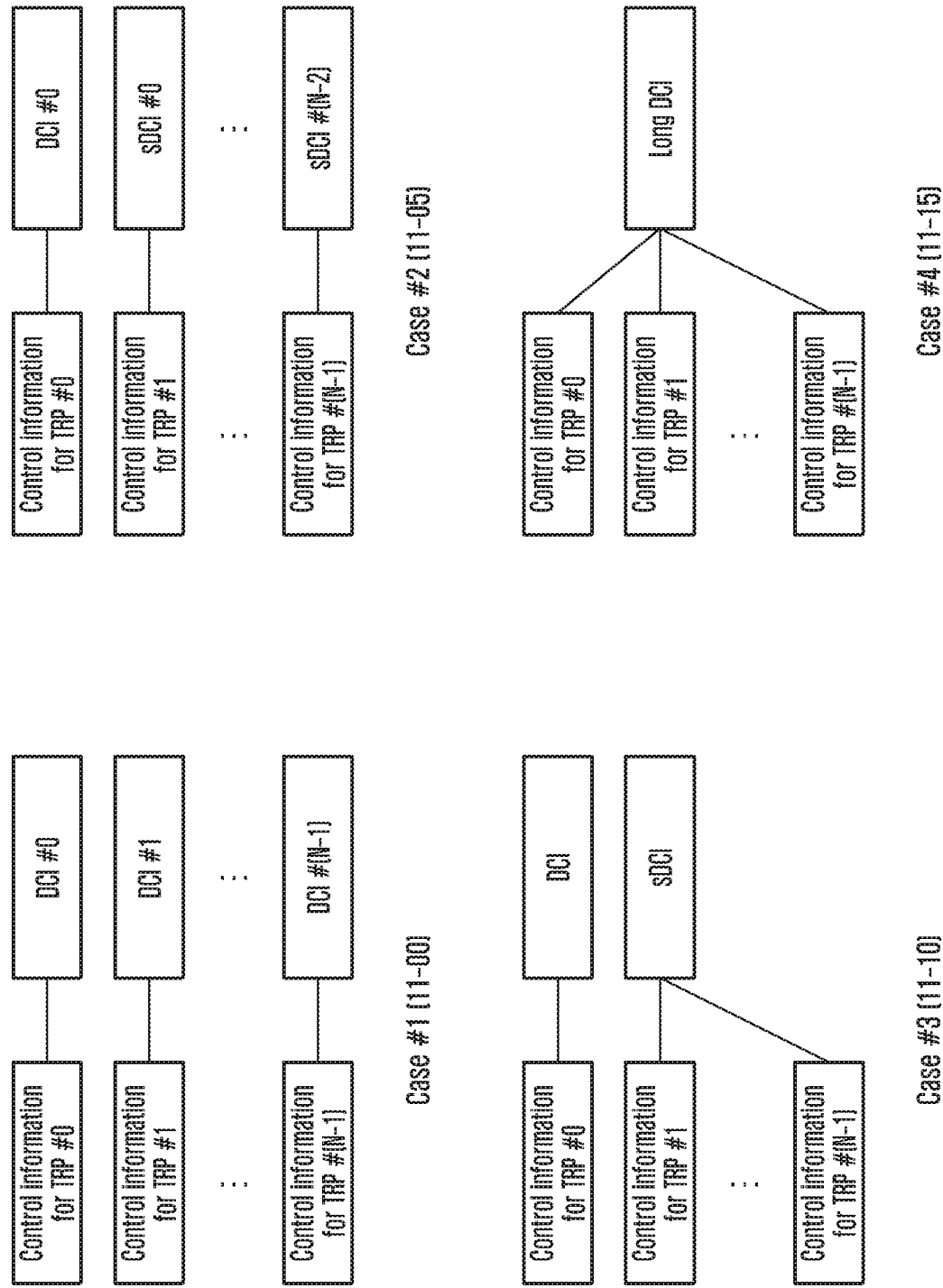
FIG. 11 illustrates an example of the configuration of downlink control information (DCI) for coordinated communication according to an embodiment of the disclosure.

FIG. 11 illustrates four examples of a DCI design for supporting NC-JT according to an embodiment of the disclosure.

Referring to FIG. 11, in Case #1 11-00, N−1 different PDSCHs are transmitted in N−1 additional TRPs (TRP #1 to TRP #N−1) other than a serving TRP (TRP #0) used when transmitting a single PDSCH. Case #1 11-00 illustrates an example in which control information about the PDSCHs transmitted in the additional TRPs is transmitted in the same DCI format as that of control information about the PDSCH transmitted in the serving TRP. That is, a UE obtains the control information about the PDSCHs transmitted in the different TRPs (TRP #0 to TRP #N−1) through pieces of DCIs (i.e., DCI #0 to DCI #N−1) having the same DCI format and the same payload. In Case #1, the degree of freedom of each PDSCH control (allocation) is completely guaranteed, while reception performance may be degraded due to a difference in coverage per DCI when the respective pieces of DCI are transmitted in the different TRPs.

Referring to FIG. 11, in Case #2 11-05, N−1 different PDSCHs are transmitted in N−1 additional TRPs (TRP #1 to TRP #N−1) other than a serving TRP (TRP #0) used when transmitting a single PDSCH. Case #2 11-05 illustrates an example in which control information about the PDSCHs transmitted in the additional TRPs is transmitted in a different form (different DCI format or different DCI payload) from that of control information about the PDSCH transmitted in the serving TRP. For example, DCI #0 transmitting the control information about the PDSCH transmitted in the serving TRP (TRP #0) may include all information elements of DCI format 1_0 or DCI format 1_1, while pieces of shortened DCI (sDCI #0 to sDCI #N−2) transmitting the control information about the PDSCHs transmitted in the cooperative TRPs (TRP #1 to TRP #N−1) may include some of the information elements of DCI format 1_0 or DCI format 1_1. Therefore, the pieces of sDCI transmitting the control information about the PDSCHs transmitted in the cooperative TRPs may have a smaller payload than the normal DCI (nDCI) transmitting the control information about the PDSCH transmitted in the serving TRP or can include as many reserved bits as the number of bits short of that of the nDCI. In Case #2, the degree of freedom of each PDSCH control (allocation) may be restricted depending on the content of an information element included in sDCI, while the reception performance of sDCI may be improved compared to that of the nDCI and thus difference in coverage per DCI is less likely to occur.

Referring to FIG. 11, in Case #3 11-10, N−1 different PDSCHs are transmitted in N−1 additional TRPs (TRP #1 to TRP #N−1) other than a serving TRP (TRP #0) used when transmitting a single PDSCH. Case #3 11-10 illustrates another example in which control information about the PDSCHs transmitted in the additional TRPs is transmitted in a different form (different DCI format or different DCI payload) from that of control information about the PDSCH transmitted in the serving TRP. For example, DCI #0 transmitting the control information about the PDSCH transmitted in the serving TRP (TRP #0) may include all information elements of DCI format 1_0 or DCI format 1_1, while the control information about the PDSCHs transmitted in the cooperative TRPs (TRP #1 to TRP #N−1) can be transmitted by collecting only some of the information elements of DCI format 1_0 or DCI format 1_1 in one piece of secondary DCI (sDCI). For example, the sDCI may include at least one of pieces of HARQ-related information, such as a frequency-domain resource assignment, a time-domain resource assignment, and an MCS of the cooperative TRPs. In addition, for information not included in the sDCI, such as a BWP indicator or a carrier indicator, it is possible to follow that in the DCI (DCI #0, normal DCI, or nDCI) of serving TRP. In Case #3, the degree of freedom of each PDSCH control (allocation) may be restricted depending on the content of an information element included in sDCI, while it is possible to adjust the reception performance of the sDCI and the DCI blind decoding complexity of a UE is lower than in Case #1 or #2.

Referring to FIG. 11, in Case #4 11-15, N−1 different PDSCHs are transmitted in N−1 additional TRPs (TRP #1 to TRP #N−1) other than a serving TRP (TRP #0) used when transmitting a single PDSCH. Case #4 11-15 illustrates an example in which control information about the PDSCHs transmitted in the additional TRPs is transmitted in the same DCI (long DCI: lDCI) as that for control information about the PDSCH transmitted in the serving TRP. That is, a UE obtains the control information about the PDSCHs transmitted in the different TRPs (TRP #0 to TRP #N−1) through the single DCI. In Case #4, the DCI blind decoding complexity of a UE is not increased, while the degree of freedom of PDSCH control (allocation) is low, for example, the number of cooperative TRPs is limited according to restriction of long DCI payload.

In the following description and embodiments, sDCI may refer to various pieces of auxiliary DCI, such as shortened DCI, secondary DCI, or normal DCI (DCI format 1_0 or 1_1 described above) including PDSCH control information transmitted in a cooperative TRP. Further, unless specifically restricted, the foregoing description may be similarly applied to these various pieces of auxiliary DCI.

In the following description and embodiments, Case #1 11-00, Case #2 11-05, and Case #3 11-10, in which one or more pieces of DCI (PDCCHs) are used for supporting NC-JT, are classified as multiple PDCCH-based NC-JT, and Case #4 11-15, in which a single piece of DCI (PDCCH) is used for supporting NC-JT, is classified as single PDCCH-based NC-JT.

In the following description and embodiments, there are provided a PDSCH prioritizing method considering multiple PDCCH-based NC-JT and single PDCCH-based NC-JT and a method for reducing UE complexity for NC-JT.

In embodiments, when actually applied, a "cooperative TRP" may be replaced with various terms, such as a "cooperative panel" or "cooperative beam".

In embodiments, although "when NC-JT is applied" may be interpreted in various ways depending on the situation, such as "when a UE simultaneously receives one or more PDSCHs in one BWP", "when a UE simultaneously receives two or more TCI indications in one BWP", or "when a PDSCH received by a UE is associated with one or more DMRS port groups", one expression is used for convenience of description.

In the disclosure, various wireless protocol structures may be used for NC-JT according to a TRP deployment scenario. For example, when there is no backhaul delay between cooperative TRPs or there is a short backhaul delay therebetween, it is possible to use a MAC layer multiplexing-based structure similar to that in 9-10 of FIG. 9 (i.e., a CA-like method). However, when a backhaul delay between cooperative TRPs is too long to be not negligible (e.g., when a time of 2 ms or longer is required for a CSI exchange or a scheduling information exchange between cooperative TRPs), it is possible to use a structure in which TRPs are independent from an RLC layer, which is similar to that in 9-20 of FIG. 9, thus securing robustness to a delay (i.e., a DC-like method).

Second Embodiment: Method for Prioritizing PDSCHs

This embodiment provides a specific method for prioritizing PDSCHs when two or more PDSCHs are scheduled in the same transmission band, for example, the same transmission band, the same component carrier, or the same BWP, and the overlapping time resource as described in the first embodiment.

Figure 12:
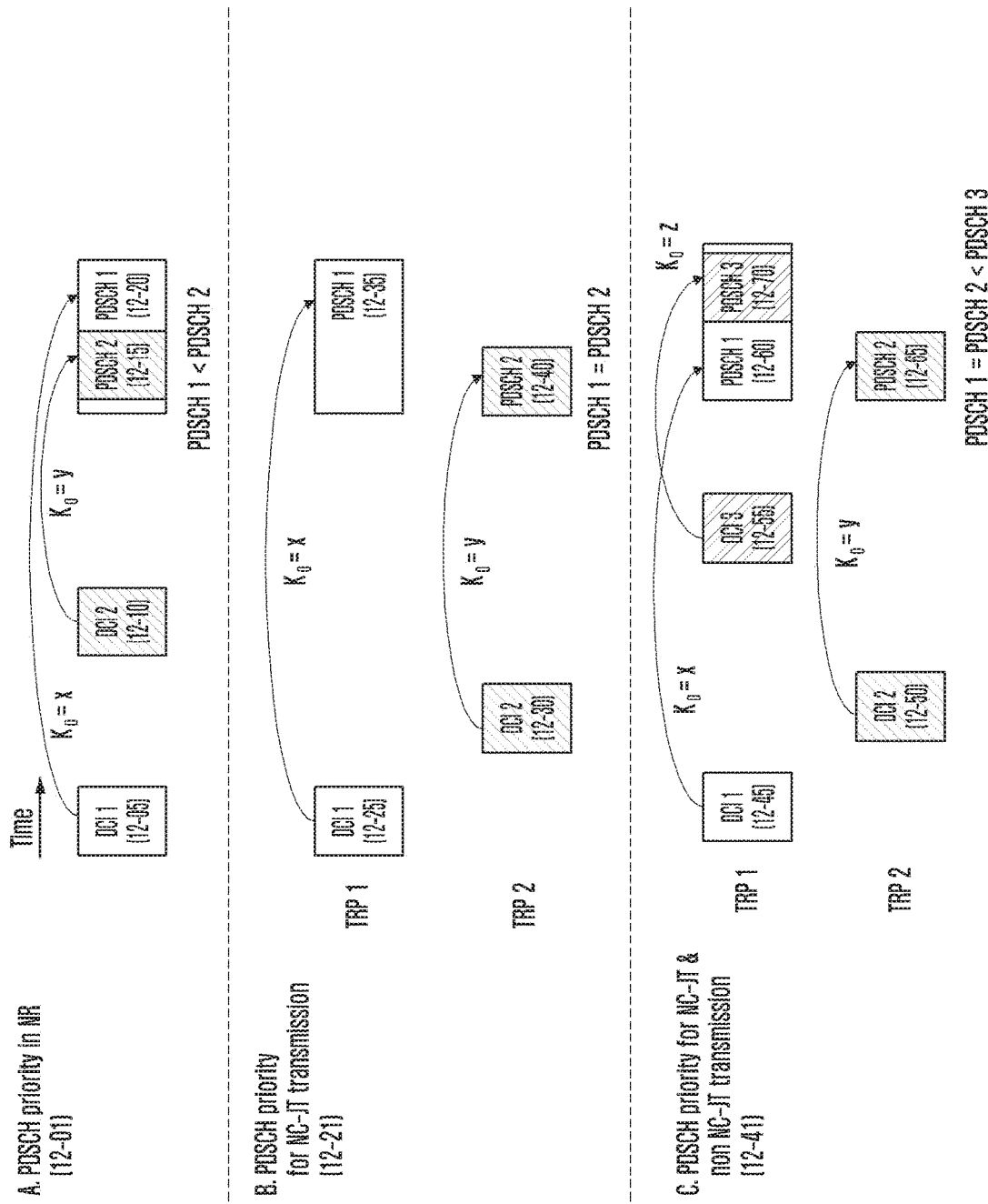
FIG. 12 illustrates the priorities of PDSCHs in NR and the priorities of PDSCHs according to an embodiment of the disclosure.

FIG. 12 illustrates the priorities of PDSCHs in current NR and the priorities of PDSCHs according to an embodiment of the disclosure.

Referring to FIG. 12, in current NR, when two or more PDSCHs are scheduled for a UE in the same transmission band and overlapping time periods, the UE is not forced to decode all of the PDSCHs (except in a special case where a PDSCH for transmitting an SIB is included or the like). Further, in current NR, when two PDSCHs are scheduled in overlapping time periods, the UE assumes that the PDSCHs may have different priorities. Specifically, pieces of schedule information about the two PDSCHs are reported to the UE via DCI or a semi-static method (12-05 and 12-10), in which a PDSCH 12-15 scheduled by DCU 2 (i.e., 12-10) reported later in order of time is assumed to have a higher priority than a PDSCH 12-20 scheduled by DCI 1 (i.e., 12-05) reported earlier in order of time (12-01). Here, the UE may operate in various ways, for example, may decode only the PDSCH having the higher priority or may decode both the PDSCH having the higher priority and the PDSCH having the lower priority, depending on implementation.

However, when NC-JT is used, a UE and a base station expect all PDSCHs scheduled in a specific time resource to be decoded, and thus it is necessary in NR to change PDSCH priorities described above. Properly designing a PDSCH priority ensures that a UE decodes all PDSCHs for NC-JT and enables the UE to essentially decode only a PDSCH having a high priority among the other PDSCHs and to autonomously determine whether to decode a PDSCH having a low priority, thus reducing UE complexity.

The following principles may be considered for prioritization. I) When PDSCHs scheduled in overlapping time resources by different pieces of DCI 12-25 and 12-30 are PDSCHs 12-35 and 12-40 for NC-JT, these PDSCHs need to have the same priority so that a UE decodes all of the PDSCHs (12-21). II) When PDSCHs scheduled in overlapping time resources by different pieces of DCI 12-05 and 12-10 are PDSCHs 12-15 and 12-20 not for NC-JT, different priorities may be applied to these PDSCHs. To apply these principles, it is necessary to distinguish a PDSCH for NC-JT and a PDSCH not for NC-JT. To this end, the following examples may be considered.

A. Time difference ($K_0$) between PDSCHs scheduled in overlapping time resources and schedule information notification times of PDSCHs: When a plurality of PDSCHs is scheduled in overlapping time resources, the UE can distinguish whether each PDSCH is for NC-JT through the $K_0$ value of each PDSCH. For example, the UE may determine that PDSCHs having the same $K_0$ value are PDSCHs for NC-JT and may determine that PDSCHs having different $K_0$ values are PDSCHs not for NC-JT. This example may be useful when the backhaul transmission delay times of respective transmission points are similar or predictable so that the schedule information notification times or $K_0$ values of PDSCHs may be equally matched. In another example, the UE may determine that PDSCHs between which the difference in $K_0$ value is within a certain value ($|x-y|$ is within a certain value in FIG. 12) are PDSCHs for NC-JT and may determine that the other PDSCHs are PDSCHs not for NC-JT. This example may be useful when it is difficult to match the schedule information notification times or the $K_0$ values of PDSCHs due to different backhaul delay times of respective transmission points.

B. TCI information about PDSCHs scheduled in overlapping time resources: When a plurality of PDSCHs is scheduled in overlapping time resources, if a TCI indicator is included in PDSCH scheduling information, such as DCI, the UE can distinguish whether each PDSCH is for NC-JT through a corresponding TCI indicator. For example, the UE may determine that PDSCHs having different TCI indicators are PDSCHs for NC-JT and may determine that PDSCHs having the same TCI indicator are PDSCHs not for NC-JT. This example may be useful when transmission/reception beams for respective transmission points are different or channel characteristics are significantly different.

C. Antenna port or DMRS CDM group information about PDSCHs scheduled in overlapping time resources: When a plurality of PDSCHs is scheduled in overlapping time resources, the UE can distinguish whether each PDSCH is for NC-JT through the antenna port or DMRS CDM group allocation of the PDSCH. For example, the UE may determine that PDSCHs having allocated antenna ports or DMRS CDM groups which do not overlap are PDSCHs for NC-JT and may determine that PDSCHs having allocated antenna ports or DMRS CDM groups, at least one of which overlaps, are PDSCHs not for NC-JT. This example may be useful when data transmitted from respective transmission points are received by the UE via different layers.

D. HARQ process information about PDSCHs scheduled in overlapping time resources: When a plurality of PDSCHs is scheduled in overlapping time resources, the UE can distinguish whether each PDSCH is for NC-JT through an HARQ process number allocated to the PDSCH. For example, the UE may determine that PDSCHs having the same HARQ process number are PDSCHs for NC-JT and may determine that PDSCHs having different HARQ process numbers are PDSCHs not for NC-JT. This example may be useful when retransmission of all data transmitted via NC-JT is managed in one HARQ process.

E. RNTI information associated with PDSCHs scheduled in overlapping time resources: When a plurality of PDSCHs is scheduled in overlapping time resources, the UE can distinguish whether each PDSCH is for NC-JT through an RNTI scrambling schedule information about the PDSCH. For example, there may be an RNTI not used for NC-JT, and there may be an RNTI used only for NC-JT. The RNTI not used for NC-JT may be an RNTI used for semi-persistent scheduling.

Examples A to E are not mutually exclusive, and two or more examples may be used in combination. For example, using example A and B at the same time, only a PDSCH satisfying the conditions specified in both examples may be determined as a PDSCH for NC-JT. Although various other combinations are possible, not all possibilities are listed in order not to obscure the subject matter of the description. In addition to the above examples, similar methods for distinguishing a PDSCH for NC-JT may be used.

When a PDSCH for NC-JT is distinguished, the UE and the base station may set the same priority for PDSCHs for NC-JT and may set different priorities for respective PDSCHs not for NC-JT. Further, when PDSCHs for NC-JT and PDSCHs not for NC-JT are mixed, different priorities may be set for PDSCHs 12-60 and 12-65 for NC-JT scheduled by pieces of DCI 12-45 and 12-55 and a PDSCH 12-70 not for NC-JT scheduled by another DCI 12-50 (12-41). When a plurality of PDSCHs having the same priority is scheduled in overlapping time resources, the UE needs to decode all of the PDSCHs. However, when a plurality of PDSCHs having different priorities is scheduled, the UE essentially needs to decode a PDSCH having the highest priority. When the UE is incapable of decoding a plurality of PDSCHs scheduled in overlapping time resources, the base station may not schedule PDSCHs having the same priority.

The following examples may be considered as a method for determining the priority of a PDSCH not for NC-JT.

1) The UE and the base station may set different priorities according to PDSCH schedule information notification time. For example, a PDSCH having a later PDSCH schedule information notification time or a smaller $K_0$ value may have a higher priority than a PDSCH in the opposite case. When PDSCHs for NC-JT and not for NC-JT are mixed, the UE and the base station may use the minimum value among the $K_0$ values of the PDSCHs to determine the priority of a PDSCH for NC-JT.

2) The UE and the base station may set different priorities according to whether a PDSCH is a PDSCH for NC-JT. For example, when PDSCHs for NC-JT and not for NC-JT are mixed, a PDSCH for NC-JT may have a higher priority than a PDSCH not for NC-JT.

3) The UE and the base station may set different priorities according to the scheme in which a PDSCH is scheduled. For example, a dynamically scheduled PDSCH via DCI or the like, may have a higher priority than a semi-persistently scheduled PDSCH, that is, a PDSCH scheduled according to a specified cycle configured via RRC.

4) The UE and the base station may set different priorities according to whether a PDSCH is repeatedly transmitted. For example, when one PDSCH is repeated during a plurality of slots while another PDSCH is not repeated, the PDSCH not repeated may have a higher priority.

Two or more of the above examples may be implement in combination as necessary, and similar methods for determining the priority of a PDSCH may be used in addition to the above examples. Further, when the above examples are implemented in combination, the priorities of the respective methods may be hierarchically configured. For example, PDSCHs may be prioritized first according to Method 3, followed by prioritization by Method 4 if there are PDSCHs having the same priority, followed by prioritization by Method 1 if there are still PDSCHs having the same priority, and then followed by prioritization by Method 2 if there are PDSCHs having the same priority. Although the order of the prioritization methods may be changed, not all possibilities are listed in order not to obscure the subject matter of the description.

Figure 13:
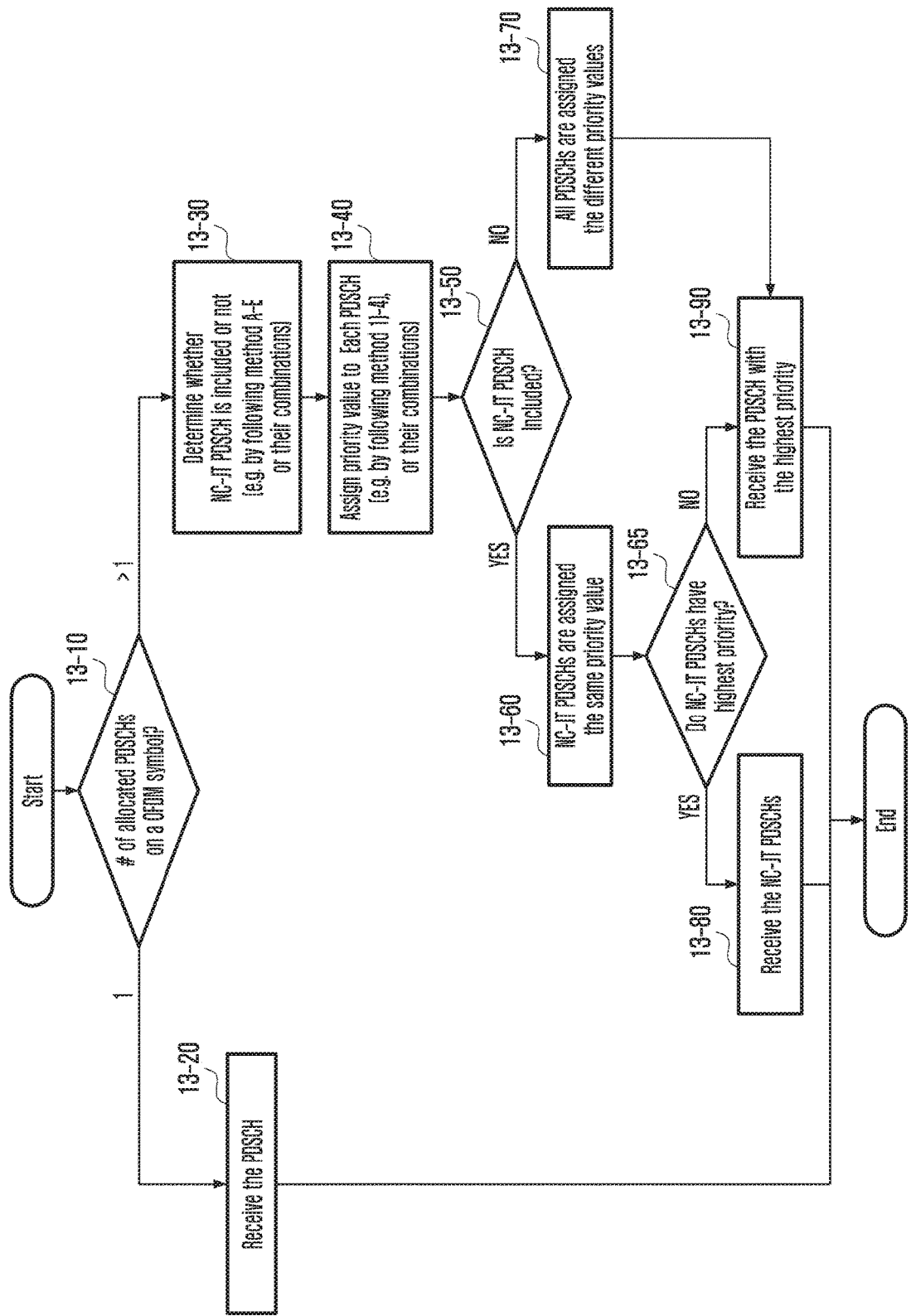
FIG. 13 is a flowchart illustrating a method for prioritizing PDSCHs scheduled in overlapping time resources according to an embodiment of the disclosure.

The methods for prioritizing PDSCHs scheduled in overlapping time resources according to the embodiment may be summarized as in a flowchart illustrated in FIG. 13.

FIG. 13 is a flowchart illustrating a method for prioritizing PDSCHs scheduled in overlapping time resources according to an embodiment of the disclosure.

Referring to FIG. 13, a UE determines the number of PDSCHs allocated on an OFDM symbol (13-10). When the number of PDSCHs is 1, the UE receives the PDSCH (13-20). When the number of PDSCHs exceeds 1, the UE determines whether an NC-JT PDSCH is included in the PDSCHs (13-30), in which at least one or more of the foregoing methods in Examples A to E may be used. Subsequently, the UE assigns a priority value to each PDSCH (13-40), in which one or more of the foregoing methods in Examples 1) to 4) may be used. When an NC-JT PDSCH is included (13-50), the same priority value is assigned for NC-JT PDSCHs (13-60), in which the priority value of the NC-JT PDSCHs may be different from that of a non-NC-JT PDSCH. When the NC-JT PDSCHs have the highest priority (13-65), the UE receives the NC-JT PDSCHs (13-80); otherwise, the UE receives a PDSCH assigned the highest priority (13-90). When no NC-JT PDSCH is included (13-50), the UE assigns different priority values to all PDSCHs (13-70) and receives a PDSCH with the highest priority (13-90).

Third Embodiment: Method for Reducing Complexity of NC-JT Supporting UE

This embodiment provides various specific methods for reducing the reception complexity of an NC-JT supporting UE.

First, in multi-PDCCH-based NC-JT, a DMRS of a specific PDSCH for NC-JT may overlap with another PDSCH for NC-JT on a frequency-time resource. In this case, decoding performance through the DMRS is degraded due to interference by the overlapping PDSCH, and high UE reception complexity is required to overcome such degradation. In one method for reducing the reception complexity of an NC-JT supporting UE, a DMRS of a PDSCH for NC-JT may be configured so as not to overlap with another PDSCH for NC-JT on a frequency-time resource. To this end, the following examples may be considered.

a. When PDSCHs transmitted in multi-PDCCH-based NC-JT overlap on frequency-time resources, a base station may configure the start positions of DMRSs for the PDSCHs on a time resource, the lengths of DMRS front-loaded symbols, DMRS types, the numbers of additional DMRS symbols, and the positions of the additional DMRS symbols to be matched. Further, the base station may configure CDM groups or DMRS ports of DMRSs of respective PDSCHs for NC-JT not to overlap.

Accordingly, the base station and the UE can avoid a DMRS of a PDSCH for NC-JT from overlapping with a DMRS or data of another PDSCH for NC-JT. The UE does not expect a case where a DMRS configuration for each PDSCH for NC-JT is different from the above configuration, that is, a case where a DMRS of a specific PDSCH is configured to overlap with a DMRS or data of another PDSCH, thereby reducing the reception complexity of the UE.

One example of the above configuration to avoid overlapping is as follows.

- The base station and the UE may share RRC configurations for DMRSs for PDSCH mapping type A and mapping type B for all PDSCHs for NC-JT, for example, DMRS-type or maxLength (the maximum number of DMRS starting symbols), and this configuration may be included in PDSCH-Config, dmrs-DownlinkForPDSCH-MappingTypeA, dmrs-DownlinkForPDSCH-MappingTypeB, or DMRS-DownlinkConfig in NR.
- Even though PDSCH mapping types indicated by pieces of DCI for respective PDSCHs are the same and both the offsets and the lengths of PDSCH-allocated symbols are the same or one or more thereof are different, the base station and the UE may configure start symbols at which DMRSs of different PDSCHs are positioned or additional symbols to have the same position or not to overlap with data of a different PDSCH.
- The base station and the UE may configure the same number of DMRS front-load symbols and the same number of DMRS CDM groups without data associated with an antenna port configuration indicated by DCI for each PDSCH and may configure a different CDM group for each antenna port.

For example, when DMRS-type=1 and the maximum number of DMRS start symbols=2, limited DMRS port combinations in Table 7 including some of the antenna port configuration values available in NR can be used for NC-JT. For example, the following details may apply.

- When two PDSCHs are scheduled for NC-JT and codepoints for the DMRS ports of these PDSCHs are 7 and 8, respectively, the numbers of front-load symbols of the DMRSs and the numbers of DMRS CDM groups without data are the same and the DMRS CDM groups are different. Thus, the DMRS ports are a DMRS port combination of that can be allocated.
- When two PDSCHs are scheduled for NC-JT and codepoints for the DMRS ports of these PDSCHs are 12 and 13, respectively, the numbers of front-load symbols of the DMRSs and the numbers of DMRS CDM groups without data are the same and the DMRS CDM groups are the same. Thus, the DMRS ports are a DMRS port combination of that cannot be allocated.

Although there are various other combinations that can be allocated/cannot be allocated, not all possibilities are listed in order not to obscure the subject matter of the description. It is also possible to redefine DMRS port combinations allocable for NC-JT and codepoints therefor.

TABLE 7

| | One Codeword: Codeword 0 enabled, Codeword 1 disabled | | |
|---|---|---|---|
| Value | Number of DMRS CDM group(s) without data | DMRS port(s) | Number of front-load symbols |
| 0 | 1 | 0 | 1 |
| 1 | 1 | 1 | 1 |
| 2 | 1 | 0, 1 | 1 |
| 3 | 2 | 0 | 1 |
| 4 | 2 | 1 | 1 |
| 5 | 2 | 2 | 1 |
| 6 | 2 | 3 | 1 |
| 7 | 2 | 0, 1 | 1 |
| 8 | 2 | 2, 3 | 1 |
| 9 | 2 | 0-2 | 1 |
| 10 | 2 | 0-3 | 1 |
| 11 | 2 | 0, 2 | 1 |
| 12 | 2 | 0 | 2 |
| 13 | 2 | 1 | 2 |
| 14 | 2 | 2 | 2 |
| 15 | 2 | 3 | 2 |
| 16 | 2 | 4 | 2 |
| 17 | 2 | 5 | 2 |
| 18 | 2 | 6 | 2 |
| 19 | 2 | 7 | 2 |
| 20 | 2 | 0, 1 | 2 |
| 21 | 2 | 2, 3 | 2 |
| 22 | 2 | 4, 5 | 2 |
| 23 | 2 | 6, 7 | 2 |
| 24 | 2 | 0, 4 | 2 |
| 25 | 2 | 2, 6 | 2 |
| 26 | 2 | 0, 1, 4 | 2 |
| 27 | 2 | 2, 3, 6 | 2 |
| 28 | 2 | 0, 1, 4, 5 | 2 |
| 29 | 2 | 2, 3, 6, 7 | 2 |
| 30 | 2 | 0, 2, 4, 6 | 2 |
| 31 | Reserved | Reserved | Reserved |

Although there may be other configurations to prevent overlapping between a DMRS of a PDSCH for NC-JT and another PDSCH for NC-JT, not all possibilities are listed in order not to obscure the subject matter of the description.

b. When PDSCHs transmitted in multi-PDCCH-based NC-JT overlap on frequency-time resources, rate matching may be indicated so that data of a specific PDSCH prevents overlapping with a DMRS of another PDSCH. For example, the base station may semi-statically configure a rate matching pattern including a DMRS symbol position of the other PDSCH and may dynamically activate the pattern by indicating the pattern to the UE via DCI in NC-JT. Alternatively, the base station may configure ZP-CSI-RSs to include the DMRS symbol position of the other PDSCH and may apply the ZP-CSI-RSs by indicating the ZP-CSI-RSs semi-statically or dynamically via DCI.

Although there may be various methods similar to the above examples, not all possibilities are listed in order not to obscure the subject matter of the description.

For an NC-JT supporting UE to simultaneously support NC-JT and MU-MIMO, both interference cancellation between a plurality of PDSCHs transmitted via NC-JT or codewords and MU interference cancellation are needed, and thus very high receiver complexity is required. NC-JT is effective when there is a transmission point that is idle due to low network traffic, whereas MU-MIMO is effective when a plurality of UEs in one cell needs to simultaneously receive data due to heavy network traffic. Therefore, it is unusual that NC-JT and MU-MIMO are used at the same time, and the UE does not expect another UE in a cell to be simultaneously scheduled in an OFDM symbol at which a PDSCH for NC-JT is positioned and does not expect a PDSCH for NC-JT to be scheduled in an OFDM symbol scheduled simultaneously for a plurality of UEs, thereby significantly reducing the complexity of the UE.

Figure 14:
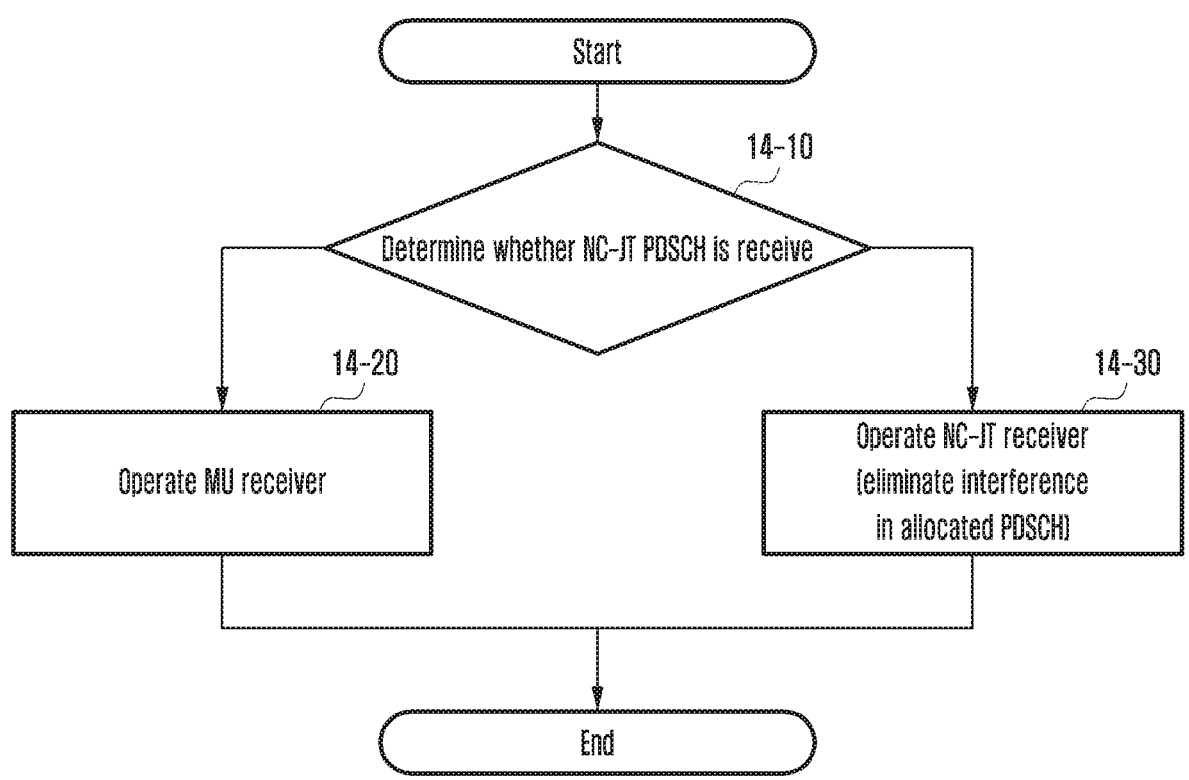
FIG. 14 is a flowchart illustrating a method for a UE to activate a receiver for only one of non-coherent joint transmission (NC-JT) and multi-user multiple-input and multiple-output (MU-MIMO) in order to reduce complexity according to an embodiment of the disclosure.

The methods for the UE to activate a receiver for only one of NC-JT and MU-MIMO at a specific time according to the embodiment may be summarized as in a flowchart illustrated in FIG. 14.

FIG. 14 is a flowchart illustrating a method for a UE to activate a receiver for only one of NC-JT and MU-MIMO in order to reduce complexity according to an embodiment of the disclosure.

Referring to FIG. 14, the UE determines whether an NC-JT PDSCH is received (14-10). This process may be performed by a combination of one or more of examples a or b described above. Alternatively, in single-PDCCH-based NC-JT, the UE may determine whether an NC-JT PDSCH is received based on the number of beams indicated by DCI, for example, the number of TCI states indicated by a TCI codepoint. When the number of TCI states indicated by the TCI codepoint is 2 or more, the UE may determine that an NC-JT PDSCH is received. When the number of TCI states is 1, the UE may not determine that an NC-JT PDSCH is received.

When no NC-JT PDSCH is received, the UE operates an MU receiver to receive data based on MU-MIMO (14-20). When the NC-JT PDSCH is received, the UE operates an NC-JT receiver to receive NC-JT data (14-30). This operation may mean that the UE eliminates interference in the allocated PDSCH, by itself.

Figure 15:
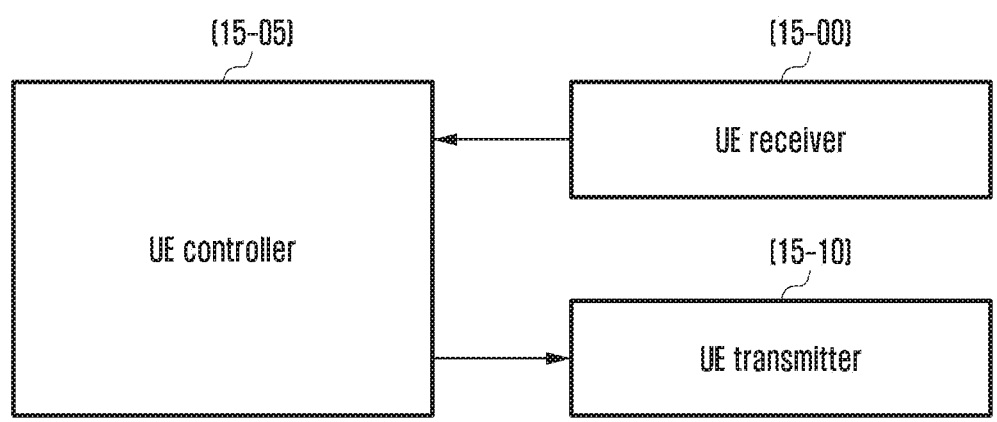
FIG. 15 illustrates the structure of a terminal according to an embodiment of the disclosure.

FIG. 15 is a block diagram illustrating the structure of a UE according to an embodiment of the disclosure.

Referring to FIG. 15, the UE may include a transceiver including a receiver 15-00 and a transmitter 15-10 and a controller 15-05 including a memory and a processor. The transceiver including the receiver 15-00 and the transmitter 15-10, and the controller 15-05, operate according to the foregoing communication method of the UE. However, components of the UE are not limited to the aforementioned examples. For example, the UE may include more components or fewer components than the aforementioned components. In addition, the transceiver 15-00 and 15-10, and the controller 15-05 may be configured as a single chip.

The transceiver including the receiver 15-00 and the transmitter 15-10 may transmit and receive a signal to and from a base station. Here, the signal may include control information and data. To this end, the transceiver including the receiver 15-00 and the transmitter 15-10 may include an RF transmitter to upconvert and amplify the frequency of a transmitted signal and an RF receiver to perform low-noise amplification of a received signal and to downconvert the frequency of the received signal. However, this is only an embodiment of the transceiver including the receiver 15-00 and the transmitter 15-10, and components of the transceiver including the receiver 15-00 and the transmitter 15-10 are not limited to the RF transmitter and the RF receiver.

In addition, the transceiver including the receiver 15-00 and the transmitter 15-10 may receive a signal through a radio channel to output the signal to the controller 15-05 and may transmit a signal output from the controller 15-05 through the radio channel.

The controller 15-05 may store a program and data necessary for the operation of the UE. The controller 15-05 may be implemented as at least one processor. Further, the controller 15-05 may store control information or data included in a signal obtained by the UE. The controller 15-05 may include a memory configured as a storage medium, such as a read only memory (ROM), a random access memory (RAM), a hard disk, a compact disc (CD)-ROM, and a digital video disc (DVD), or a combination of storage media.

The controller 15-05 may control a series of processes such that the UE may operate according to the foregoing embodiments. According to some embodiments, the controller 15-05 may control a component of the UE to receive pieces of DCI of two layers, thus simultaneously receiving a plurality of PDSCHs.

Figure 16:
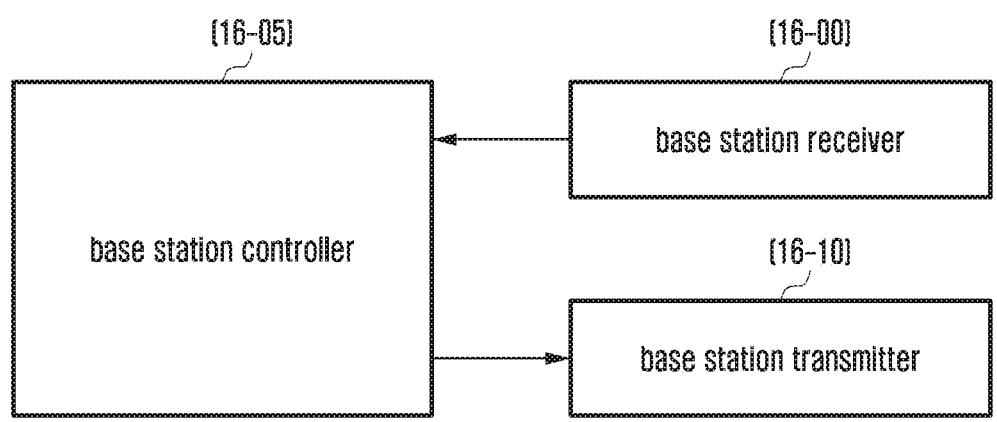
FIG. 16 illustrates the structure of a base station according to an embodiment of the disclosure.

FIG. 16 is a block diagram illustrating the structure of a base station according to an embodiment of the disclosure.

Referring to FIG. 16, the base station may include a transceiver including a receiver 16-00 and a transmitter 16-10 and a controller 16-05 including a memory and a processor. The transceiver including the receiver 16-00 and the transmitter 16-10, and the controller 16-05, may operate according to the foregoing communication method of the base station. However, components of the base station are not limited to the aforementioned examples. For example, the base station may include more components or fewer components than the aforementioned components. In addition, the transceiver including the receiver 16-00 and the transmitter 16-10, and the controller 16-05 may be configured as a single chip.

The transceiver including the receiver 16-00 and the transmitter 16-10 may transmit and receive a signal to and from a UE. Here, the signal may include control information and data. To this end, the transceiver including the receiver 16-00 and the transmitter 16-10 may include an RF transmitter to upconvert and amplify the frequency of a transmitted signal and an RF receiver to perform low-noise amplification of a received signal and to downconvert the frequency of the received signal. However, this is only an embodiment of the transceiver including the receiver 16-00 and the transmitter 16-10, and components of the transceiver including the receiver 16-00 and the transmitter 16-10 are not limited to the RF transmitter and the RF receiver.

In addition, the transceiver including the receiver 16-00 and the transmitter 16-10 may receive a signal through a radio channel to output the signal to the controller 16-05 and may transmit a signal output from the controller 16-05 through the radio channel.

The controller 16-05 may store a program and data necessary for the operation of the base station. The controller 16-05 may be implemented as at least one processor. Further, the controller 16-05 may store control information or data included in a signal obtained by the base station. The controller 16-05 may include a memory configured as a storage medium, such as a ROM, a RAM, a hard disk, a CD-ROM, and a DVD, or a combination of storage media.

The controller 16-05 may control a series of processes such that the base station may operate according to the foregoing embodiments. According to some embodiments, the controller 16-05 may control each component of the base station to configure pieces of DCI of two layers including allocation information about a plurality of PDSCHs and to transmit the DCIs.

While, the disclosure has been shown and described with reference to various embodiments thereof, it will be understood by those skilled in the art that various changes in form and details may be made therein without departing from the spirit and scope of the disclosure as defined by the appended claims and their equivalents. Further, if necessary, the above respective embodiments may be employed in combination. For example, any number of any of the embodiments of the disclosure may be combined to operate the base station and the terminal.

What is claimed is:

1. A method performed by a terminal in a wireless communication system, the method comprising:
   receiving, from a first transmission and reception point (TRP), first downlink control information (DCI) scheduling a first physical downlink shared channel (PDSCH);
   receiving, from a second TRP, second DCI scheduling a second PDSCH, wherein the first PDSCH and the second PDSCH are fully or partially overlapped in a time-frequency domain; and
   receiving, from the first TRP, the first PDSCH based on a first demodulation reference signal (DMRS); and
   receiving, from the second TRP, the second PDSCH based on a second DMRS,
   wherein a number of front-loaded DMRS symbol, a number of additional DMRS symbol, a DMRS symbol location and a DMRS configuration type are same for the first DMRS and the second DMRS.

2. The method of claim 1, further comprising:
   in case that a first antenna ports field for the first DMRS and a second antenna ports field for the second DMRS indicate a different value, decoding the first PDSCH and the second PDSCH with a same priority,
   wherein the first DCI includes the first antenna ports field, and
   wherein the second DCI includes the second antenna ports field.

3. The method of claim 2, wherein the first PDSCH and the second PDSCH are data transmissions of a non-coherent joint transmission (NC-JT) between the first TRP and the second TRP.

4. The method of claim 3, wherein a multiple user (MU) multiple input multiple output (MIMO) is not applied to the terminal, in case that the data transmissions of the NC-JT are received.

5. A method performed by a first transmission and reception point (TRP) in a wireless communication system, the method comprising:
   transmitting, to a terminal, first downlink control information (DCI) scheduling a first physical downlink shared channel (PDSCH); and
   transmitting, to the terminal, the first PDSCH based on a first demodulation reference signal (DMRS),
   wherein second DCI scheduling a second PDSCH is transmitted to the terminal from a second TRP,
   wherein the second PDSCH is transmitted to the terminal based on a second DMRS,
   wherein the first PDSCH and the second PDSCH are fully or partially overlapped in a time-frequency domain, and
   wherein a number of front-loaded DMRS symbol, a number of additional DMRS symbol, a DMRS symbol location and a DMRS configuration type are same for the first DMRS and the second DMRS.

6. The method of claim 5,
   wherein, in case that a first antenna ports field for the first DMRS and a second antenna ports field for the second DMRS indicate a different value, the first PDSCH and the second PDSCH are decoded with a same priority at the terminal,
   wherein the first DCI includes the first antenna ports field, and
   wherein the second DCI includes the second antenna ports field.

7. The method of claim 6, wherein the first PDSCH and the second PDSCH are data transmissions of a non-coherent joint transmission (NC-JT) between the first TRP and the second TRP.

8. The method of claim 7, wherein a multiple user (MU) multiple input multiple output (MIMO) is not applied to the terminal, in case that the data transmissions of the NC-JT are transmitted.

9. A terminal in a wireless communication system, the terminal comprising:
   a transceiver configured to transmit and receive a signal; and
   a processor configured to:
      receive, from a first transmission and reception point (TRP), first downlink control information (DCI) scheduling a first physical downlink shared channel (PDSCH),
      receive, from a second TRP, second DCI scheduling a second PDSCH, wherein the first PDSCH and the second PDSCH are fully or partially overlapped in a time-frequency domain, and
      receive, from the first TRP, the first PDSCH based on a first demodulation reference signal (DMRS), and
      receive, from the second TRP, the second PDSCH based on a second DMRS,
   wherein a number of front-loaded DMRS symbol, a number of additional DMRS symbol, a DMRS symbol location and a DMRS configuration type are same for the first DMRS and the second DMRS.

10. The terminal of claim 9, wherein the processor is further configured to:
    in case that a first antenna ports field for the first DMRS and a second antenna ports field for the second DMRS indicate a different value, decode the first PDSCH and the second PDSCH with a same priority,
    wherein the first DCI includes the first antenna ports field, and
    wherein the second DCI includes the second antenna ports field.

11. The terminal of claim 10, wherein the first PDSCH and the second PDSCH are data transmissions of a non-coherent joint transmission (NC-JT) between the first TRP and the second TRP.

12. The terminal of claim 11, wherein a multiple user (MU) multiple input multiple output (MIMO) is not applied to the terminal, in case that the data transmissions of the NC-JT are received.

13. A first transmission and reception point (TRP) in a wireless communication system, the first TRP comprising:
    a transceiver configured to transmit and receive a signal; and
    a processor configured to:
    transmit, to a terminal, first downlink control information (DCI) scheduling a first physical downlink shared channel (PDSCH), and
    transmit, to the terminal, the first PDSCH based on a first demodulation reference signal (DMRS),
    wherein second DCI scheduling a second PDSCH is transmitted to the terminal from a second TRP,
    wherein the second PDSCH is transmitted to the terminal based on a second DMRS,
    wherein the first PDSCH and the second PDSCH are fully or partially overlapped in a time-frequency domain, and
    wherein a number of front-loaded DMRS symbol, a number of additional DMRS symbol, a DMRS symbol location and a DMRS configuration type are same for the first DMRS and the second DMRS.

14. The first TRP of claim 13,
wherein, in case that a first antenna ports field for the first DMRS and a second antenna ports field for the second DMRS indicate a different value, the first PDSCH and the second PDSCH are decoded with a same priority at the terminal,
wherein the first DCI includes the first antenna ports field, and
wherein the second DCI includes the second antenna ports field.

15. The first TRP of claim 14, wherein the first PDSCH and the second PDSCH are data transmissions of a non-coherent joint transmission (NC-JT) between the first TRP and the second TRP.

16. The first TRP of claim 15, wherein a multiple user (MU) multiple input multiple output (MIMO) is not applied to the terminal, in case that the data transmissions of the NC-JT are transmitted.

* * * * *